US012521627B2

(12) United States Patent
Krishnan et al.

(10) Patent No.: US 12,521,627 B2
(45) Date of Patent: Jan. 13, 2026

(54) INDIRECT VIDEO GAME CONTEXT DETERMINATION BASED ON GAME I/O

(71) Applicant: Sony Interactive Entertainment Inc., Tokyo (JP)

(72) Inventors: Rathish Krishnan, Los Gatos, CA (US); Chockalingam Ravi Sundaram, Belmont, CA (US); Charlie Denison, San Mateo, CA (US); Ryder McMinn, San Francisco, CA (US); Orlando Cardoso, San Diego, CA (US); Warren Benedetto, Foothill Ranch, CA (US); Vinit Acharya, Milpitas, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 214 days.

(21) Appl. No.: 18/208,159

(22) Filed: Jun. 9, 2023

(65) Prior Publication Data

US 2024/0408483 A1    Dec. 12, 2024

(51) Int. Cl.
*A63F 13/52*        (2014.01)
*A63F 13/5378*      (2014.01)
(Continued)

(52) U.S. Cl.
CPC .......... *A63F 13/52* (2014.09); *A63F 13/5378* (2014.09); *A63F 13/60* (2014.09);
(Continued)

(58) Field of Classification Search
CPC ...... A63F 13/52; A63F 13/5378; A63F 13/60; G06V 20/70; G06F 3/04817
See application file for complete search history.

(56) References Cited

U.S. PATENT DOCUMENTS 6,352,479 B1   3/2002   Sparks
8,515,253 B2   8/2013   Cottrell
(Continued)

FOREIGN PATENT DOCUMENTS

WO   2014100770 A2   6/2014
WO   2021156848 A1   8/2021

OTHER PUBLICATIONS

Erdelyi, Using Computer Vision Techniques to Play an Existing Video Game, Available online at: https://scholarworks.calstate.edu/downloads/7w62f8544, May 6, 2019, 50 pages.
(Continued)

*Primary Examiner* — David L Lewis
*Assistant Examiner* — Shauna-Kay Hall
(74) *Attorney, Agent, or Firm* — Kilpatrick Townsend & Stockton LLP

(57) ABSTRACT

A system for generating gameplay context information for a game may include a game screen classification module trained to classify contextually relevant data from gameplay data, one or more game object recognition modules trained to detect game icons from gameplay data, and a multimodal context generation neural network module trained to generate structured gameplay context information from the contextually relevant data and icons within the gameplay data. The multimodal context generation neural network module at least partially generates structured gameplay context information. The modules may include neural networks trained by suitable machine learning algorithms using suitable masked data and labeled data.

20 Claims, 16 Drawing Sheets

(51) Int. Cl.
  *A63F 13/60* (2014.01)
  *G06F 3/04817* (2022.01)
  *G06V 20/70* (2022.01)
(52) U.S. Cl.
  CPC .......... *G06F 3/04817* (2013.01); *G06V 20/70* (2022.01); *G06V 2201/07* (2022.01)

(56) References Cited

U.S. PATENT DOCUMENTS

| | | | |
|---|---|---|---|
| 9,364,743 | B2 | 6/2016 | Miura et al. |
| 9,457,264 | B1 | 10/2016 | Chyou et al. |
| 9,630,097 | B2 | 4/2017 | Paradise et al. |
| 9,782,678 | B2 | 10/2017 | Long et al. |
| 10,335,690 | B2 | 7/2019 | Schleicher |
| 10,456,680 | B2 | 10/2019 | Miron et al. |
| 11,071,910 | B1 | 7/2021 | Landers et al. |
| 11,338,210 | B2 | 5/2022 | Benedetto et al. |
| 2001/0016510 | A1 | 8/2001 | Ishikawa et al. |
| 2006/0046234 | A1 | 3/2006 | Sperry |
| 2011/0246621 | A1 | 10/2011 | May et al. |
| 2011/0269540 | A1 | 11/2011 | Gillo et al. |
| 2012/0202594 | A1 | 8/2012 | Bistis et al. |
| 2013/0079134 | A1 | 3/2013 | Walker et al. |
| 2013/0249947 | A1 | 9/2013 | Reitan |
| 2013/0260894 | A1 | 10/2013 | Graf et al. |
| 2014/0038701 | A1 | 2/2014 | Allen et al. |
| 2014/0162780 | A1 | 6/2014 | Suzuki |
| 2014/0258469 | A1 | 9/2014 | Maharajh et al. |
| 2014/0278686 | A1 | 9/2014 | Mullings et al. |
| 2015/0157938 | A1 | 6/2015 | Domansky et al. |
| 2015/0231502 | A1 | 8/2015 | Allen et al. |
| 2016/0255409 | A1 | 9/2016 | Feldstein et al. |
| 2017/0064014 | A1 | 3/2017 | Nomura |
| 2017/0087460 | A1 | 3/2017 | Perry |
| 2017/0259177 | A1 | 9/2017 | Aghdaie et al. |
| 2018/0365935 | A1 | 12/2018 | Howell et al. |
| 2020/0061465 | A1 | 2/2020 | Benedetto et al. |
| 2020/0122031 | A1 | 4/2020 | Sherwani et al. |
| 2020/0139245 | A1 | 5/2020 | Jarzebinski |
| 2020/0289932 | A1 | 9/2020 | Benedetto et al. |
| 2021/0038998 | A1 | 2/2021 | Tallarico et al. |
| 2021/0086089 | A1 | 3/2021 | Pardeshi et al. |
| 2021/0146241 | A1 | 5/2021 | Bleasdale-Shepherd et al. |
| 2021/0151034 | A1 | 5/2021 | Hasan et al. |
| 2021/0213353 | A1 | 7/2021 | Berg et al. |
| 2021/0362060 | A1* | 11/2021 | Sachson ................ G06F 16/687 |
| 2021/0370183 | A1 | 12/2021 | Dorn et al. |
| 2021/0394060 | A1 | 12/2021 | Yilmazcoban et al. |
| 2022/0019744 | A1 | 1/2022 | Yu et al. |
| 2022/0096937 | A1 | 3/2022 | Dorn et al. |
| 2023/0024836 | A1 | 1/2023 | Bennett et al. |
| 2023/0078380 | A1 | 3/2023 | Zaghetto et al. |
| 2024/0408484 | A1* | 12/2024 | Yao ........................ G06F 3/013 |

OTHER PUBLICATIONS

Marczak, et al., Audio Visual Analysis of Player Experience: Feedback-based Gameplay Metrics, Game Research Method, Jan. 2015, pp. 207-230.

International Application No. PCT/US2024/026478, International Search Report and Written Opinion mailed on Sep. 17, 2024, 11 pages.

"Dynamic resolution Scaling has become a common" Ask a Game Dev, Published, Nov. 24, 2020. Accessed Jun. 14, 2023, Available Online at: https://askagamedev.tumblr.com/post/635692229684510720/dynamic-resolution-scaling-has-become-a-common.

Battaglia, Alex "Radeon Boost analysed: is AMD's new dynamic resolution technology a game-changer?" Eurogamer, Published Dec. 19, 2019. Accessed: Jun. 14, 2023, Available at: https://www.eurogamer.net/digitalfoundry-2019-radeon-software-adrenalin-2020-radeon-boost-analysis.

Cheng, et al. "TallFormer: Temporal Action Localization with a Long-memory Transformer" Dept. of Comp. Sci. Univ. of North Carolina at Chapel Hill, ArXiv, Jul. 26, 2022, Available at: https://arxiv.org/pdf/2204.01680.pdf.

Clark et al. "ELECTRA: Pre-training Text Encoders as Discriminators Rather Than Generators" ArXiv abs/2003. 10555, 2020.

D. Sasirekha et al. "Text to Speech: A simple Tutorial" Int. J. of Sort Computing and Eng. (IJSCE) vol. 2 Iss. Mar. 1, 2012 ISSN: 2231-2307.

Dutoit, Thierry "High Quality Text to Speech Synthesis: An Overview" Faculte Polyechnique de Mons, TCTS lab, 1997.

Fuzhen Zhuang et al. "A Comprehensive Survey on Transfer Learning" In Proceedings of the IEEE, vol. 109, No. 1, pp. 43-76, Jan. 2021.

Hdeep "What Is Dynamic Resolution Scaling? Real-time Rendering will Prioritize the FPS" Define CPU, Aug. 22, 2022, Accessed: Jun. 14, 2023, available at: https://definecpu.com/dynamic-resolution-scaling/.

Hochreiter & Schmidhuber "Long Short-term memory" Neural Computation 9(8):1735-1780 (1997).

Nadkarni et al. "Natural Language Processing: an introduction" J. Am. Med. Assoc. 2011; 18:544-551 accessed Jun. 27, 2023.

Radford et al. "Improving Language Understanding by Generative Pre-training" Open AI, Jun. 2018.

U.S. Appl. No. 18/208,166 to Chen Yao et al., filed Jun. 9, 2023.
U.S. Appl. No. 18/208,179 to Chen Yao et al., filed Jun. 9, 2023.
U.S. Appl. No. 18/208,191 to Chen Yao et al., filed Jun. 9, 2023.
U.S. Appl. No. 18/208,200 to Chen Yao et al., filed Jun. 9, 2023.

Vaswani, Ashish; Shazeer, Noam; Parmar, Niki; Uszkoreit, Jakob; Jones, Llion; Gomez, Aidan N.; Kaiser, Lukasz; Polosukhin, Illia (Dec. 5, 2017). "Attention Is All You Need". arXiv:1706.03762.

International Search Report and Written Opinion for International Application No. PCT/US2024/030758, dated Aug. 15, 2024.

* cited by examiner

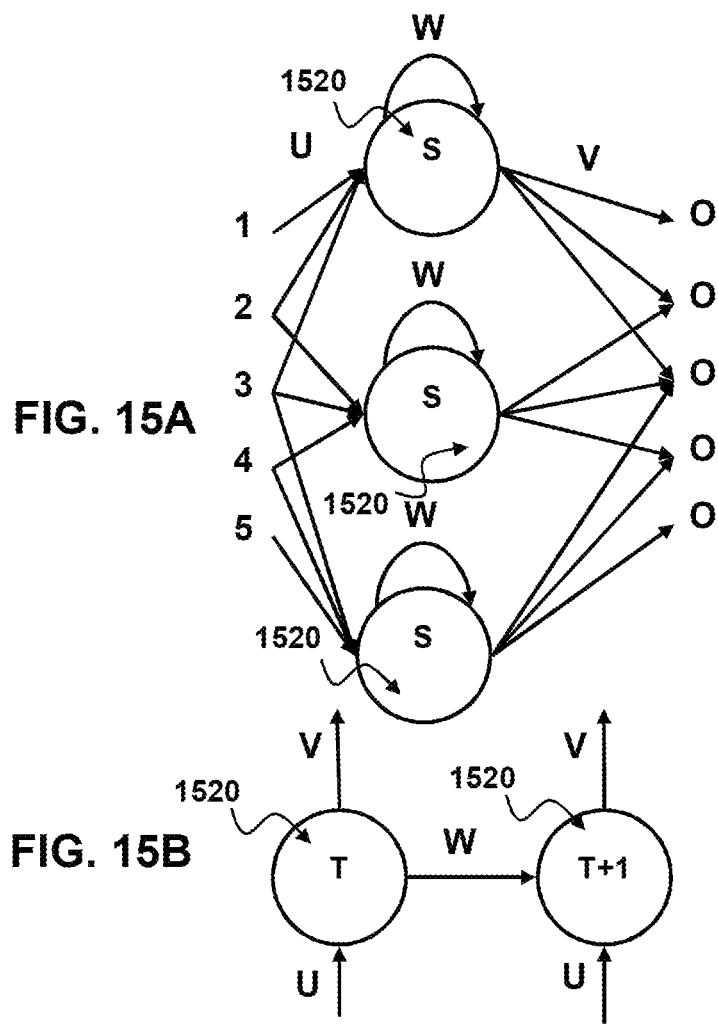
FIG. 15A
FIG. 15B
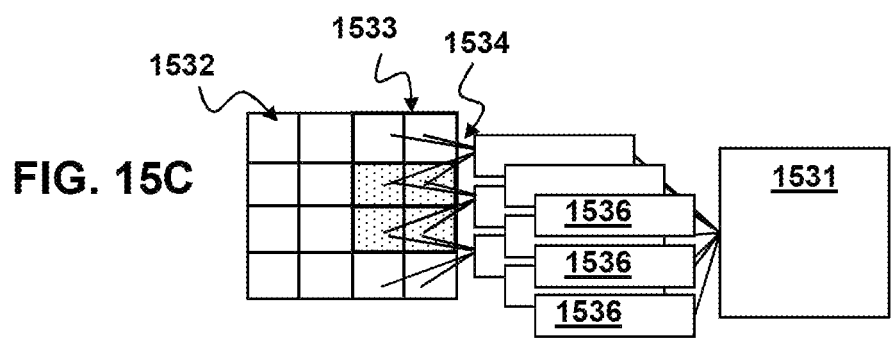
FIG. 15C

INDIRECT VIDEO GAME CONTEXT DETERMINATION BASED ON GAME I/O

FIELD OF THE DISCLOSURE

Aspects of the present disclosure relate to game services specifically the present disclosure relates to determination of game context from unstructured game data.

BACKGROUND OF THE DISCLOSURE

Some game console makers ask game developers making games for the console to provide structured context information about their games to the console operating system so that the console can provide enhanced game services to the user. Game developers are often reluctant to expose so much information about their game to the game console operating system and, as such, only provide the bare minimum information to the game console. Legacy games developed for older console versions were not required to provide structured information to the console. Additionally, some game engines are not able to provide the structured information required by the game console operating system.

The game console operating system may be able to collect information from the user while the user is playing the game. For example, the console may receive inputs from a peripheral such as button presses on game controller. The console operating system may also be able to examine certain unstructured information from the game such as image frame data to be rendered and audio data to be played in an output device (e.g., a speaker). Thus, it would be desirable to generate structured context information when such information is not directly provided by the game.

It is within this context that aspects of the present disclosure arise.

BRIEF DESCRIPTION OF THE DRAWINGS

The teachings of the present disclosure can be readily understood by considering the following detailed description in conjunction with the accompanying drawings, in which:

FIG. 15A is a simplified node diagram of a recurrent neural network according to aspects of the present disclosure.

FIG. 15B is a simplified node diagram of an unfolded recurrent neural network according to aspects of the present disclosure.

FIG. 15C is a simplified diagram of a convolutional neural network according to aspects of the present disclosure.

DESCRIPTION OF THE SPECIFIC EMBODIMENTS

Although the following detailed description contains many specific details for the purposes of illustration, anyone of ordinary skill in the art will appreciate that many variations and alterations to the following details are within the scope of the invention. Accordingly, examples of embodiments of the invention described below are set forth without any loss of generality to, and without imposing limitations upon, the claimed invention.

Modern game consoles use structured context information to provide additional services for the user. These additional services may provide new types of functionalities for games running on the console. For example and without limitation, the new types of functionalities may include: help screens using player data, operating system provided player statistics, game plans, Game session data, tournament data, and presence data. Enabling these functions requires a large amount of data provided by the game to the console in a structured way so that the console may use and understand the data, this structured data may also be referred to as context information or structured context information. Providing this structured context information requires the game developers to place context data sharing functionality into game or game engine code. This may be a burden for game developers and may be difficult to implement for legacy games without meticulous code documentation. Game console manufacturers would like to enable this functionality without providing additional burden to the game developers.

Multi-modal neural network systems can use data having multiple modalities and predict a label that takes into account the modalities of data. The different modalities of data provided to a game console may include for example and without limitation, audio data, video data, peripheral input data, motion data and user generated data. To reduce the workload of game developers and enable functionality on legacy application multi-modal data may be used with an inference engine that includes at least one multi-modal neural network to generate structured context information for use with services that provide additional functionality on the console.

Figure 1:
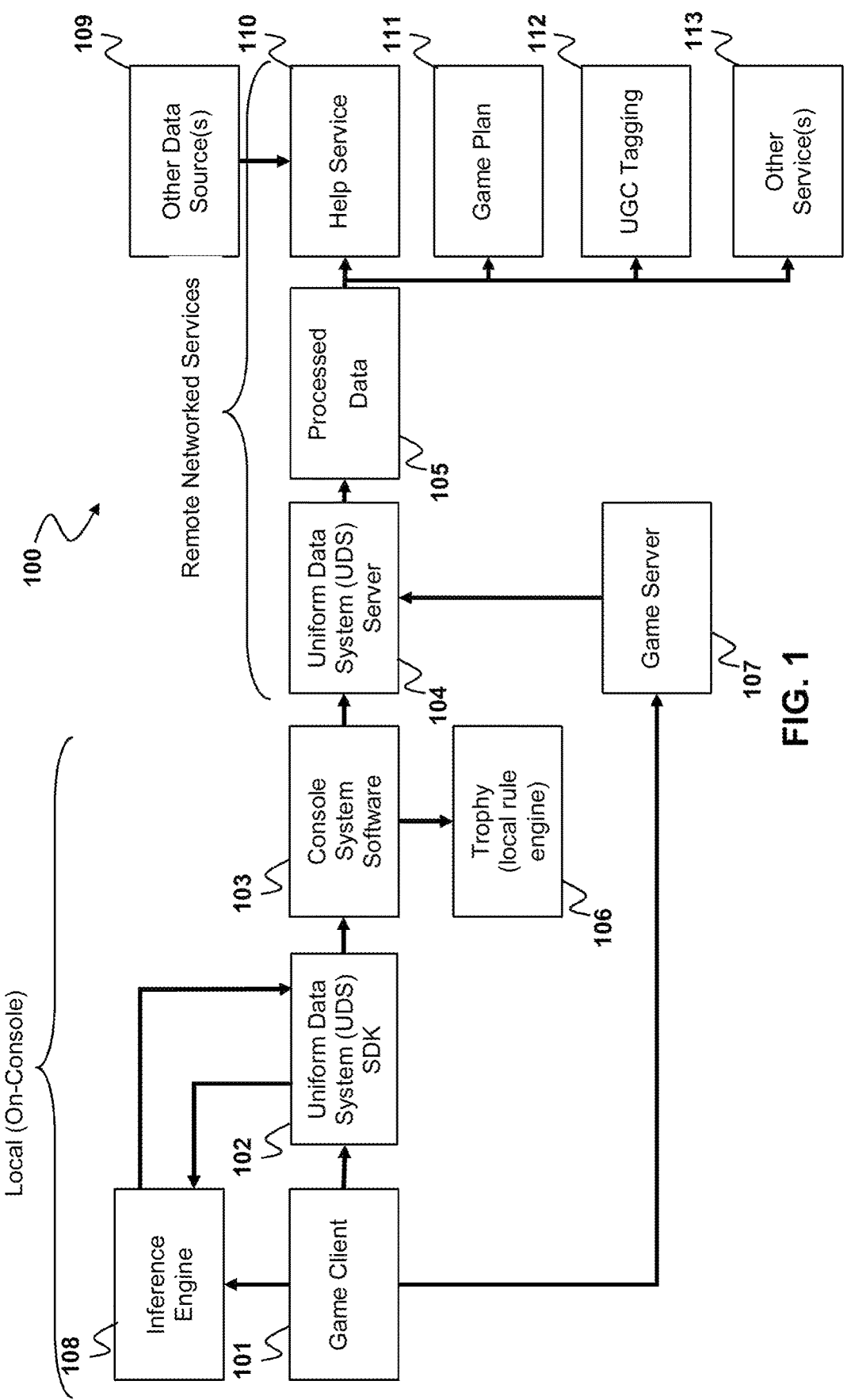
FIG. 1 is a diagram of an example of a system architecture for generating contextual information from unstructured data and providing the contextual information to services that provide users with information regarding available game activities and game status according to an aspect of the present disclosure.

FIG. 1 is a diagram of an example of a system architecture 100 for generating contextual information from unstructured data and providing the contextual information to services that provide users with information regarding available game activities and game status according to an aspect of the present disclosure. In some implementations the system 100 includes a game client 101, a uniform data system (UDS) software development kit (SDK) 102, console system software 103, a local rule engine 106, a UDS server 104, processed data 105, an inference engine 108 and one or more networked services including a help service 110, game plan 111, user generated content (UG) tagging 112, and other service(s) 113. The help service may also receive information from other data source(s) 109.

The game client 101 and game server 107 may provide contextual information regarding a plurality of applications to a uniform data system (UDS) service 104 via a UDS data model describing the logical structure of UDS data used by the UDS SDK 102. Game clients 101 may not natively provide contextual information in the UDS structure in which case the inference engine 109 receives unstructured data and generates structured context data in the UDS format. The inference engine 109 additionally may generate a probability score representing the likelihood that the contextual information is correctly generated in the UDS format. The UDS data model enables the platform to create remote networked services, such as the help service 110, game plan 111, UG content tagging 112 and other service(s) 109 that require game data, without requiring each game to be patched separately to support each service. The UDS data model assigns contextual information to each portion of information in a unified way across games. The contextual information from the game client 101, and UDS SDK 102 s provided to the UDS server 104 via the console system software 103. Additionally, the UDS SDK 102 may share information with the inference engine 108 to improve prediction of other contextual information. An alternative implementation, the game client 101 may provide contextual information (game context update) in the UDS data format to the inference engine through the UDS server 104 at game context update points or at a game context update interval. The update points or update intervals may be too sparse to capture all events occurring within the game client in which case the inference engine may generate structured context data between game context update points or points in the game context update interval. The inference engine may use the game context updates from the game client as base data points and update the base data points with generated context data. This may be referred to as game context update interpolation. The game client 101, inference engine 108, UDS SDK 102, console system software 103 and local rule engine 106, may all run on a computer or other suitable hardware for executing the plurality of applications.

The UDS server 104 receives and stores contextual information from the game client 101 and game server 107. The contextual information from the game client may either be directly provided by the game client in the UDS format or generated from unstructured game data by the inference engine 108. The UDS server 104 may receive contextual information from a plurality of game clients and game servers for multiple users. The information may be uniformly processed 105 and received by the plurality of networked services 110, 111, 112, and 113.

Figure 2:
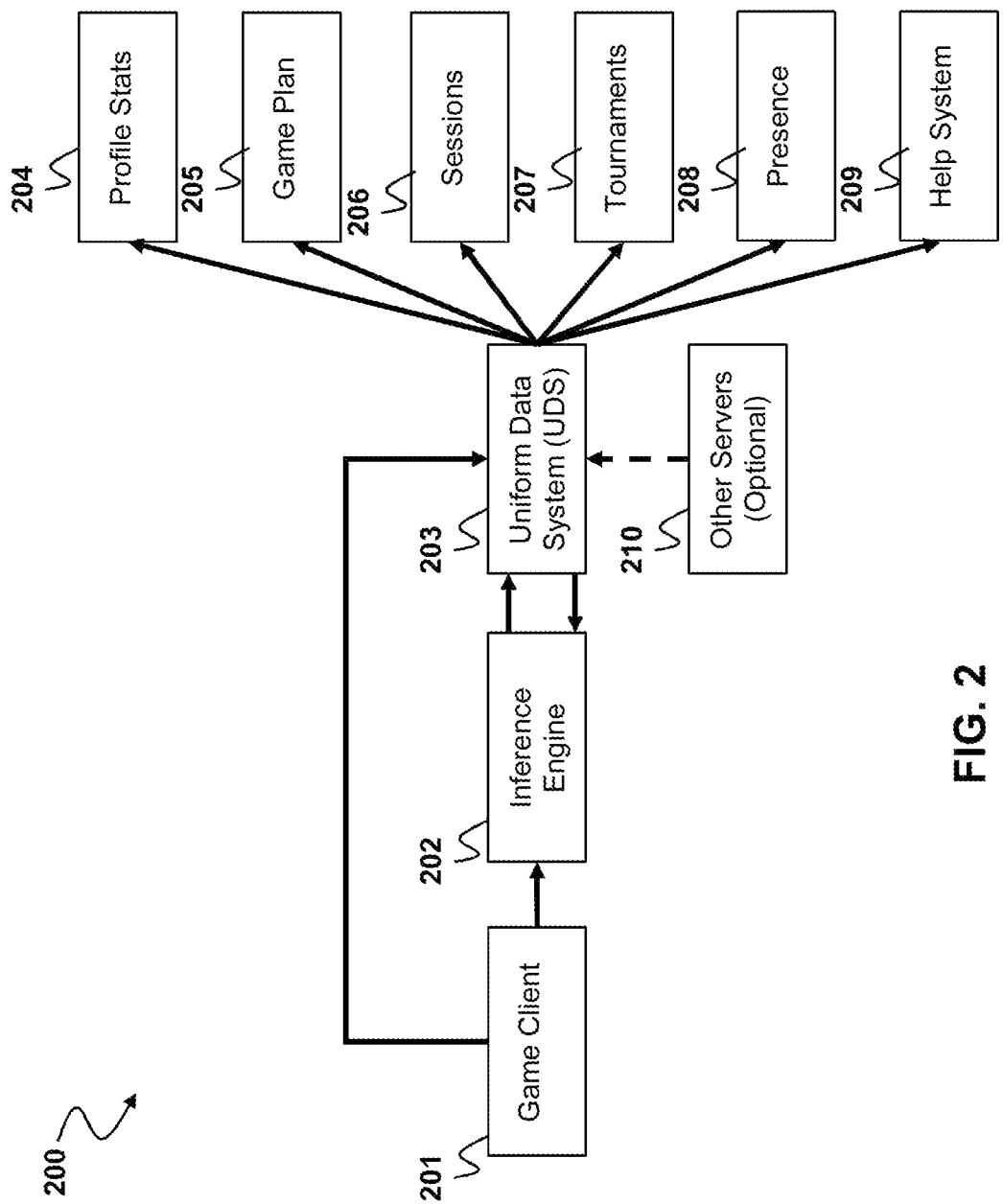
FIG. 2 is a diagram of another example system architecture according to aspects of the present disclosure.

FIG. 2 shows another example system architecture 200 according to aspects of the present disclosure. A game client 201 may send contextual information to a UDS system 203. The game client 202 may also provide unstructured data to the inference engine 202 which may then create structured context information from the unstructured data and provide that context information to the UDS system 203. Structured context information may also be shared in the reverse direction from the UDS system to game client and inference engine to further support the generation of structured context information. The UDS system 203 provides contextual information to a plurality of services profiles stats 204, game plan 205, session 206, tournaments 207, presence 208 and help system 209. The UDS system 203 may be implemented on a remote server or may be implemented local to the client. The local UDS system 203 may receive aggregated UDS data from other servers to generate the services. For example and without limitation, the UDS system may receive profile information from a user profile server to generate profile stats. Similarly, the UDS system may receive tournament information from a tournament server to generate the tournament service.

Figure 11:
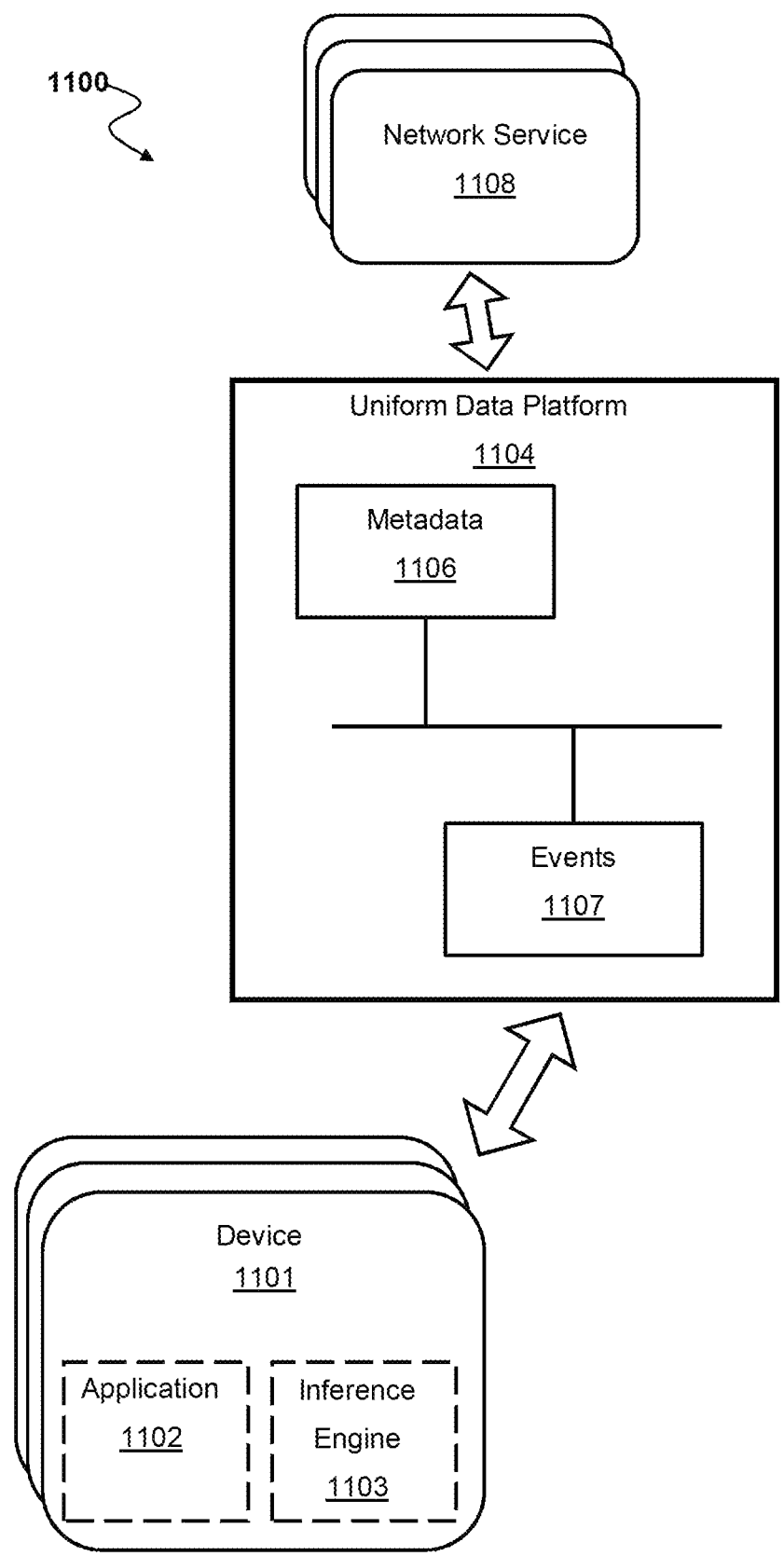
FIG. 11 shows an example system for providing a data model using an inference engine with a uniform data platform according to aspects of the present disclosure.

FIG. 11 shows an example system for providing a data model using an inference engine with a uniform data platform 1100 according to aspects of the present disclosure. In the implementation shown the system 1100 includes at least one device 1101 configured to execute at least on a plurality of applications 1102, each application may have an application data structure (also referred to as contextual information) available to the device or the application may not provide the application data structure to the device in which case the inference engine 1103 may generate the application data. The inference engine 1103 may take unstructured data generated during operation of at least one of the plurality of applications and predict application data from the unstructured data. A uniform data platform 1104 can be executed on one or more servers or on the device. The uniform data platform 1104 includes a data model which is uniform across the plurality of application data structures that are available to the device. Additionally, the inference engine 1103 generates application data according to the data model of the uniform data platform 1104 thus supplementing data for applications in the plurality of applications that do not make their application data structure available. The data model may include metadata 1106 corresponding to at least one object indicated in the data model and events 1107 corresponding to a trigger condition with at least one metadata entry. The values of the meta data 1106 and events 1107 can be associated with a user profile. The uniform data platform 1104 may be configured to receive application data from at least one device 1101 and store the application data within the data model. The system can also include a plurality of remote networked services 1108 configured to access the application data from the uniform data platform 1104 using the data model.

In some implementations the metadata 1106 may include: a list of all activities a user can do in an application, an activity name, a description of the activity, a state of the activity (whether available, started, or completed), whether the activity is required to complete an objective or campaign, a completion reward for the activity, an intro or outro cutscene, an in-game location, player location within the game, one or more conditions that must be met before the activity becomes available, and a parent activity that contains the activity as a sub-activity. Metadata 1106 may further include: a list of abilities and effects that take place including corresponding timestamps and locations, an in-game coordinate system, a list of in-game branch situations, and telemetry indicative of when a branch situation is encountered, and which option is selected by the user. A list of in-game statistics, items, lore, in-game zone and corresponding attributes regarding each statistic, item, lore, or zone may also be included in the metadata 1106. Additionally, the metadata 1106 may indicate whether or not a particular activity, entity (such as a character, item, ability, etc.), setting, outcome, action, effect, location, or attribute should be marked as hidden.

Events 1107 may be initiated in response to various trigger conditions. For example and without limitation, trigger conditions may include: an activity that was previously unavailable becomes available, a user starts an activity, a user ends an activity, an opening or ending cut scene for an activity begins or ends, the user's in-game location or zone changes, an in-game statistic changes, an item or lore is acquired, an action is performed, an effect occurs, the user interacts with a character, item, or other in-game entity, and an activity, entity, setting, outcome, action, effect, location or attribute is discovered. The events may include additional information regarding a state of the application when the events 1107 where trigger, for example a timestamp, a difficulty setting and character statistics at the time a user starts or ends an activity, success or failure of an activity or a score or duration of time associated with a completed activity.

Figure 3:
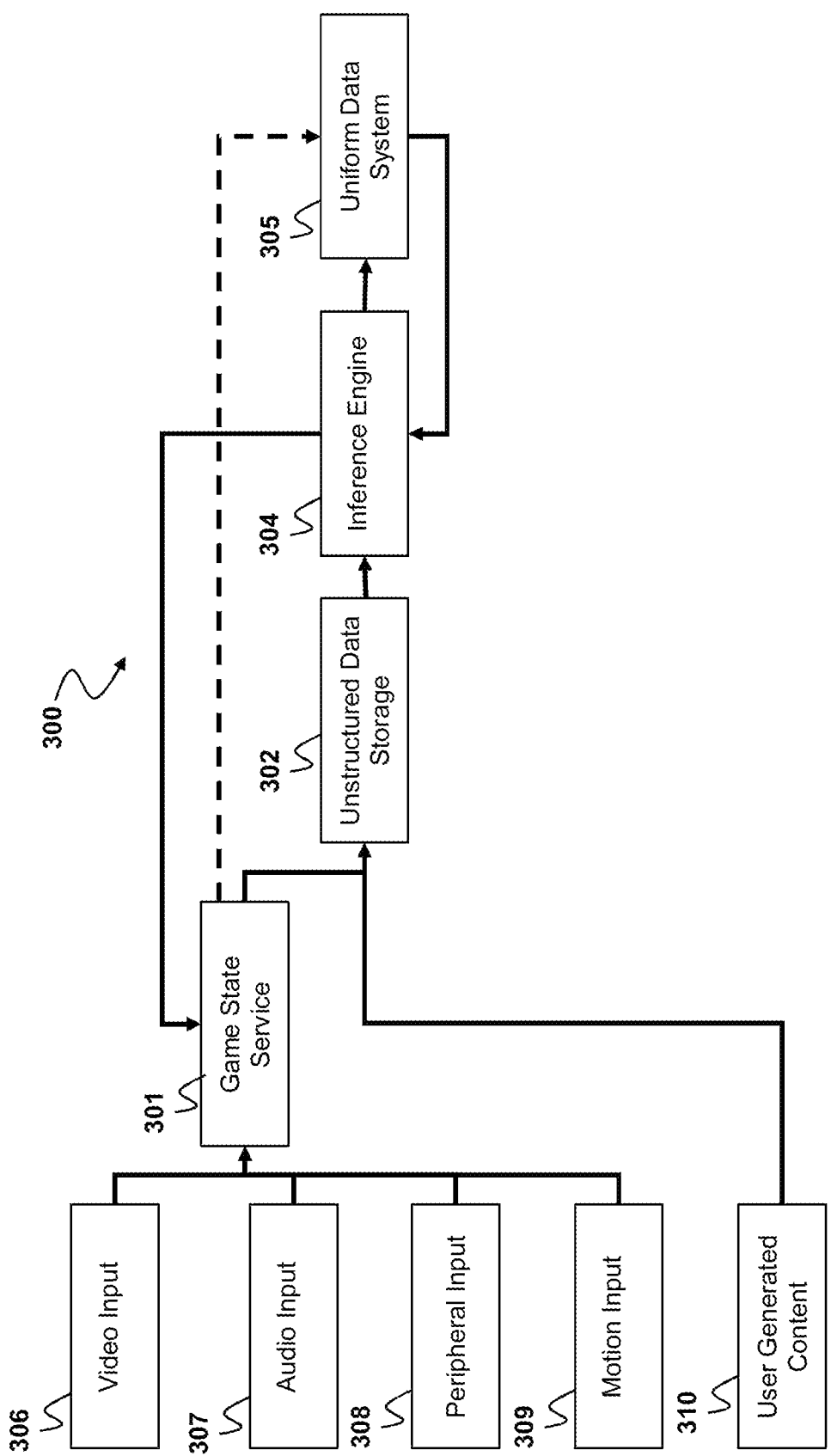
FIG. 3 is a diagram showing an example system architecture having the sources of unstructured data according to aspects of the present disclosure.

FIG. 3 is a diagram showing an example system architecture 300 having the sources of unstructured data according to aspects of the present disclosure. In the implementation shown the system 300 is executing an application that does not expose the application data structure to the uniform data system 305. Instead, the inputs to the application such as peripheral input 308 and motion input 309 are interrogated by a game state service 301 and sent to unstructured data storage 302. The game state service 301 also interrogates unstructured application outputs such as video data 306 and audio data 307 and stores the data with unstructured data storage 302. Additionally, user generated content (UGC) 310 may be used as inputs and provided to the unstructured data storage 302. The game state service 301 may collect raw video data from the application which has not entered the rendering pipeline of the device. Additionally, the game state service 301 may also have access to stages of the rendering pipeline and as such may be able to pull game buffer or frame buffer data from different rendered layers which may allow for additional data filtering. Similarly raw audio data may be intercepted before it is converted to an analog signal for an output device or filtered by the device audio system.

The inference engine 304 receives unstructured data from the unstructured data storage 302 and predicts context information from the unstructured data. The context information predicted by the inference engine 304 may be formatted in the data model of the uniform data system. The inference engine 304 may also provide context data for the game state service 301 which may use the context data to pre-categorize data from the inputs based on the predicted context data. The information from the inference engine 304 can be used to store useful information, such as whether an audio clip includes a theme song or a current image is a daytime image). This stored information can then be used by a game state service 301 to categorize new data, e.g., in the form of a lookup or closeness similarity. For example, if the inference engine finds that a piece of audio data is a theme song the game state service 301 could simply provide this piece with the contextual label whenever it appears in the unstructured data. In some implementations, the game state service 301 may provide game context updates at update points or at game context update interval to the UDS 305. These game context updates may be provided by the UDS 305 to the inference engine 304 and used as base data points that are updated by context data generated by the inference engine.

The context information may then be provided to the UDS service 305. As discussed above the UDS may be used to provide additional services to the user. The UDS service 305 may also provide structured information to the inference engine 304 to aid in the generation of context data.

Figure 4:
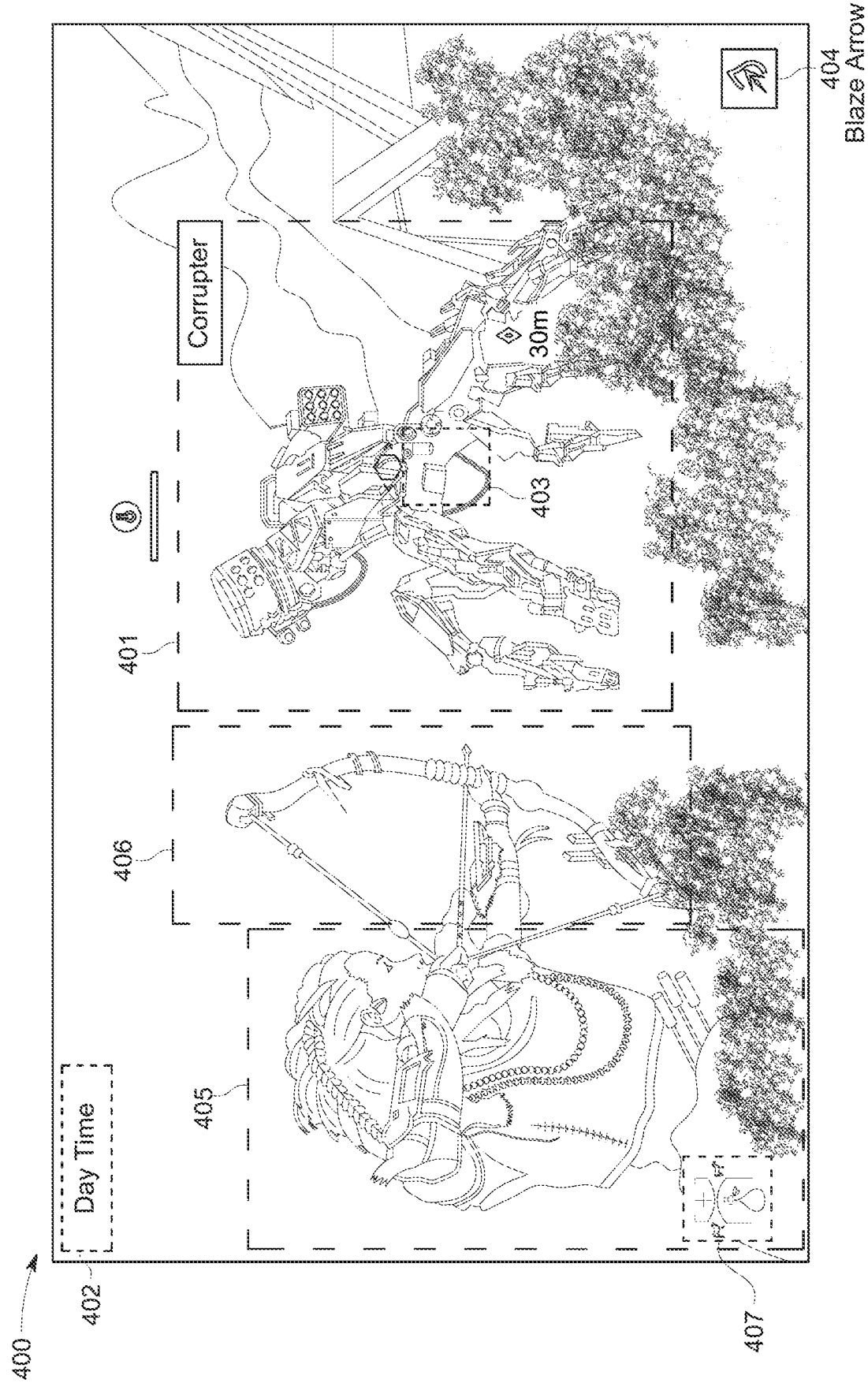
FIG. 4 depicts an example of decomposition of a game screen with the inference engine according to aspects of the present disclosure.

FIG. 4 depicts an example of decomposition of a game screen 400 with the inference engine according to aspects of the present disclosure. The game screen holds a large amount of context information that may be predicted and formatted into contextual information by the inference engine. For example, the inference engine may be trained with a machine learning algorithm to identify that the screen is showing; the user 405, with a bow 406, fighting an enemy 401, in the daytime 402. The inference engine may identify generic context information as discussed and in some implementations the inference engine may be further trained to identify specialized context information based on, for example and without limitation, the game title. The inference engine with specialized training may predict further context information for the scene based on the game title so the decomposed game screen 400 may be predicted as Aloy 405, protagonist of the Horizon games, wielding a Carja Hunter bow 406, aimed at the weak point 403 of a corruptor type enemy 401 in the daytime 402. Additionally, the inference engine may be trained to identify various contextual elements of the user interface such as shown here, an ammo type is active and ammo count 404, and that there is an item in the active inventory 407. Specialized training of the inference engine may allow the inference engine to provide further context to the decomposed screen, for example that the active ammo type is blaze arrows and the health portions are in the active inventory slot.

Figure 5:
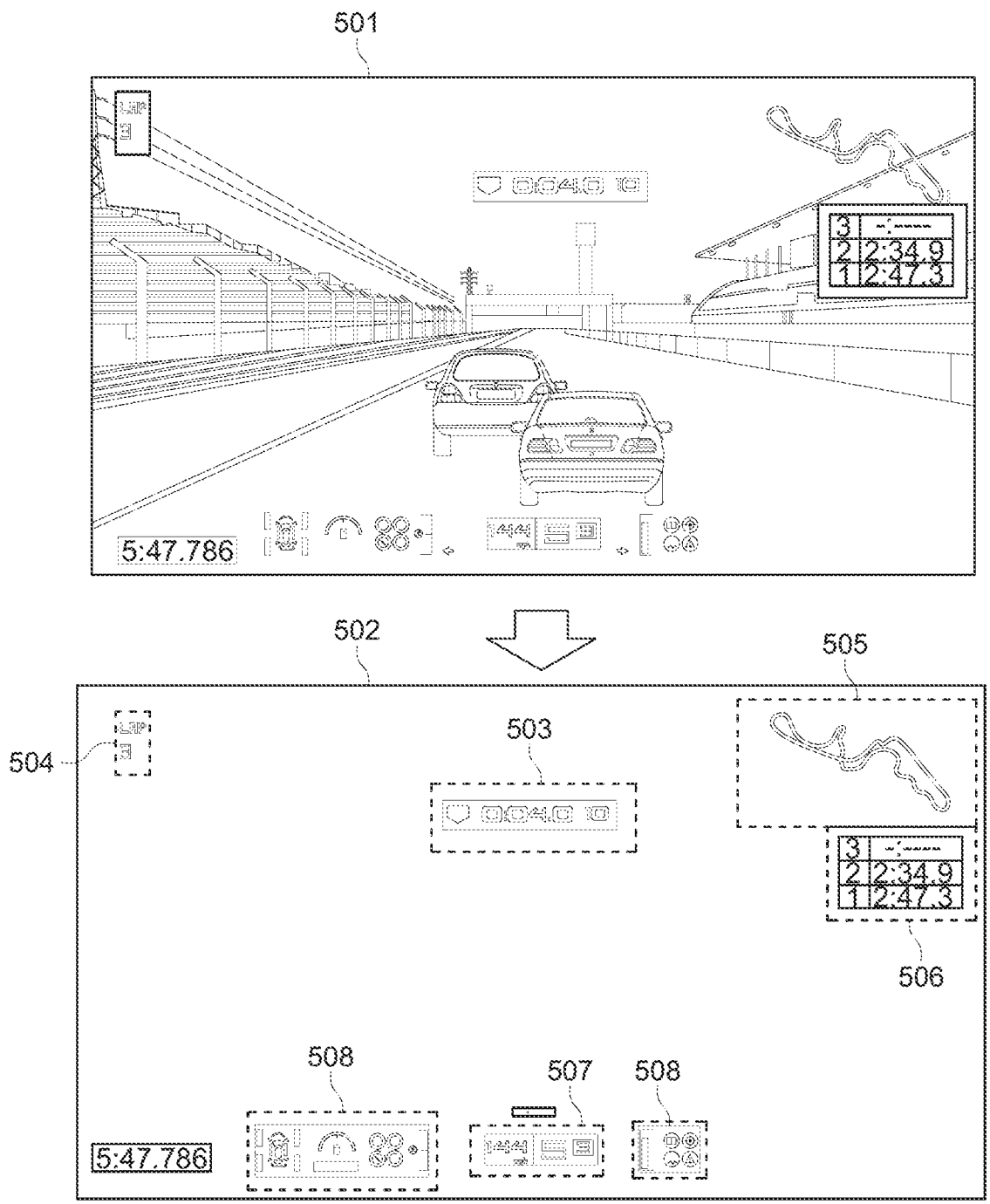
FIG. 5 shows an example game screen with extracted user interface elements according to aspects of the present disclosure.

FIG. 5 shows an example game screen with extracted user interface elements according to aspects of the present disclosure. Here, a final rendered image 501 and the User interface (UI) rendering layer 502 for a racing game is shown. The inference engine may receive user interface rendering layer images from the game state service. The UI often includes densely packed information for the user of the application and as such processing power and processing time may be saved by decomposing the UI rendering layer to generate context information. The inference engine here may predict contextual information within the UI layer. For example and without limitation, in the racing UI shown the inference engine may identify the context information of lap time 503, lap number 504, track name and track position 505, race ranking and relative time ranking 506, current speed and drive gear number 507, and Fuel level and active vehicle features 508. This information may be placed by the inference engine in the data model of the UDS as metadata or used for activities. Thus, with only data available on the rendering layer a large amount of contextual information may be predicted, this saves processing power and time because modules of the inference engine that operate on images/video do not need to operate on the entire image.

Figure 6:
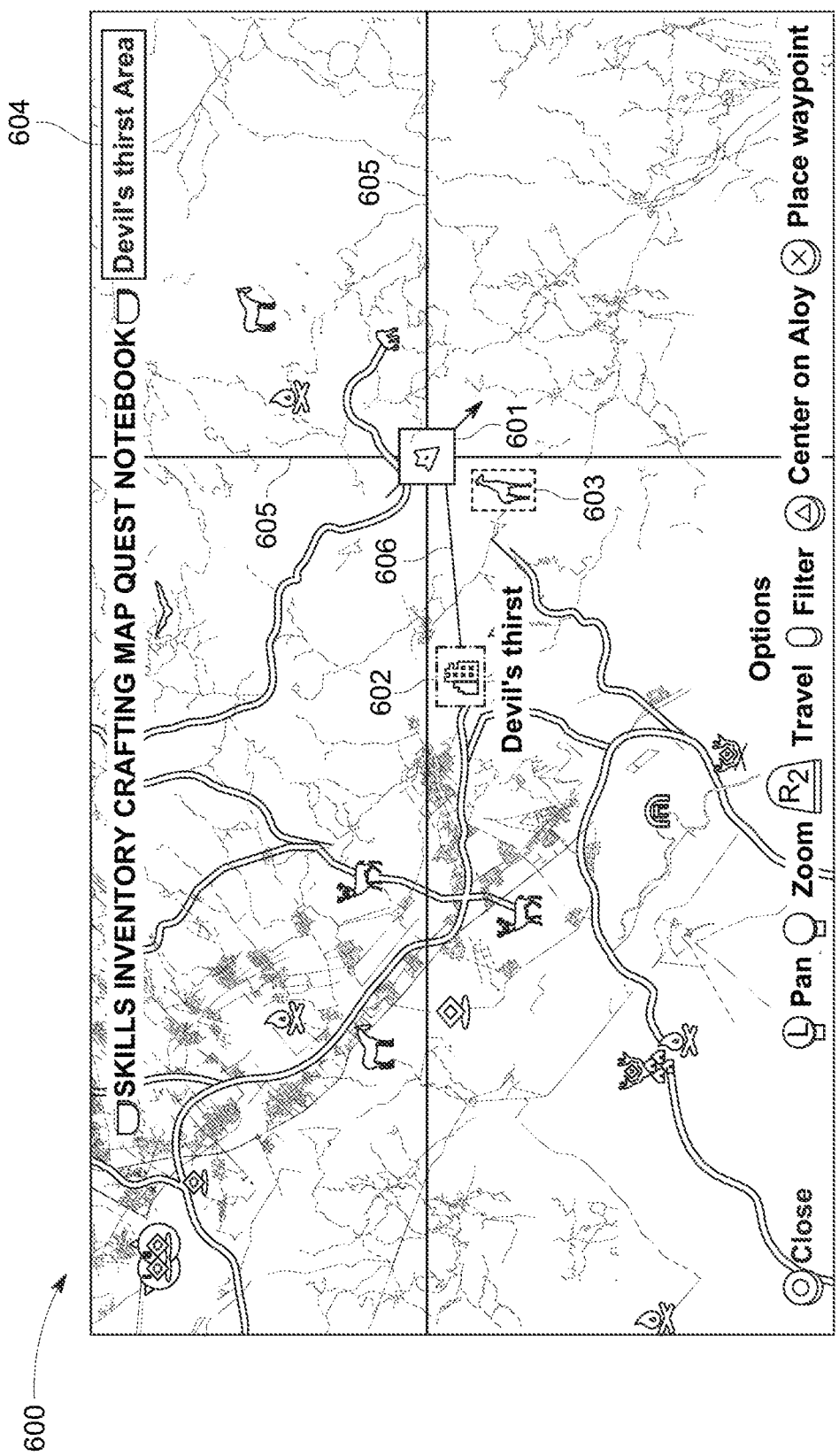
FIG. 6 depicts an example of contextually important data, a map screen and the decomposition of elements within the map screen by the inference engine according to aspects of the present disclosure.

FIG. 6 depicts an example of contextually important data, a map screen 600 and the decomposition of elements within the map screen by the inference engine according to aspects of the present disclosure. The inference engine may be trained to recognize elements of the contextually important screens 600 and generate structured context data from the screen. Here the contextually important data is a map screen. Contextually important screens contain a lot of information that a player may find useful and that may be used to construct structured context information in the data model of the UDS. Contextually important screens may include for example and without limitation; map screens, inventory screens, quest screens, achievement screens, character statistic screens, level selection screens, mail screens, menu screens, or pause screens. In some implementations one or more modules of the inference engine may be trained to recognize the contextually important screens before decomposing the entire screen. For example and without limitation, one or more modules of the inference engine may recognize inputs indicating a contextually important screen such as, a particular pause screen sound, death screen sound, menu screen sound, a menu button input, pause button press input, a UI layer change, a particular color change or similar.

As shown the inference engine may be trained to generate context from elements of the contextually important data. Context information generated from the map screen 600 may include player location 601, landmark location 602, tracked enemy location 603, map name or area name 604. The location of tracked items on the map screen may be an absolute 605 or may be relative 606 to other landmarks. The absolute map location 605 may be expressed as for example and without limitation as X and Y coordinates for the center pixel of a bounding box around the identified player marker. The relative location may for example and without limitation be the distance between the center of a bounding box around the identified player marker and a bounding box around an identified landmark marker.

Figure 7:
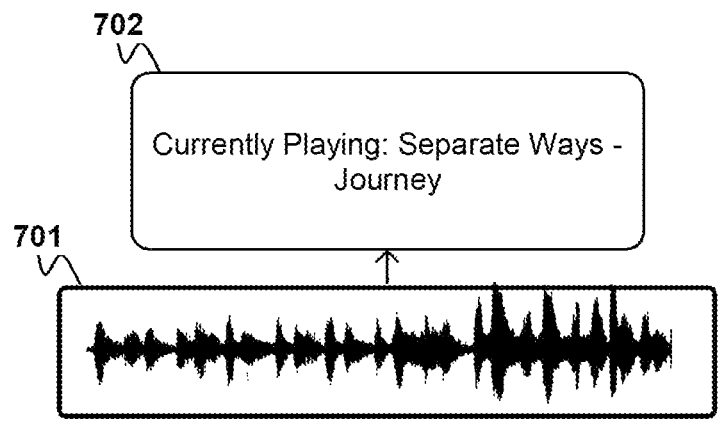
FIG. 7 is a diagram depicting an example of classification of unlabeled audio data by the inference engine according to aspects of the present disclosure.

FIG. 7 is a diagram depicting an example of classification of unlabeled audio data by one or more modules of the inference engine according to aspects of the present disclosure. The inference engine may be a multi-modal system which includes different modules which may include neural networks trained to classify audio from unlabeled audio. In the implementation shown, the unlabeled audio is represented as a waveform 701, the module of the inference engine is trained to generate a classification 702 of the sound wave form that includes a song name and artist name.

Figure 8:
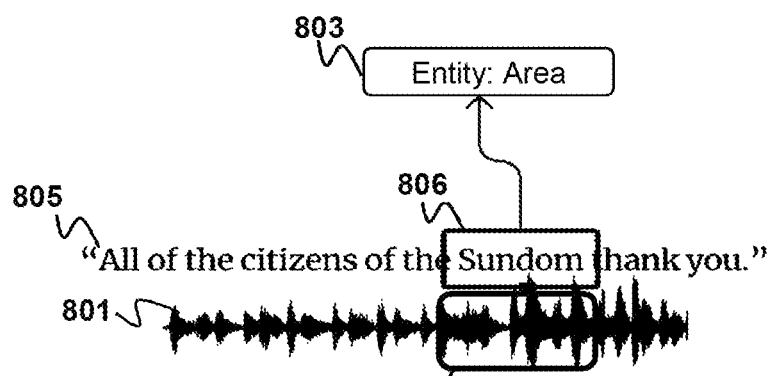
FIG. 8 is a diagram showing an example of keyword recognition in unlabeled text data by one or more modules of the inference engine according to aspects of the present disclosure.

FIG. 8 is a diagram showing an example of keyword recognition in unlabeled text data by one or more modules of the inference engine according to aspects of the present disclosure. The inference engine may be a multi-modal system which includes different modules which may include neural networks trained to recognize particular parts of text from unlabeled text. In the implementation shown the text is a caption 805 of a piece of audio represented by a waveform 801, the module of the inference engine is trained to recognize a type of text segment 806. Here, the module is trained to recognize entities and entity type. The module shown recognizes "Sundom" as an entity of the type: area name and provides that feature 803 each time such a text segment is detected. The output of the recognition module may be both the feature 803 and the segment of text 806 that includes the feature. The segment of audio 802 that corresponds to the feature in the segment of text 806 may also be output by the module. In some implementations the module may include optical character recognition components which may convert text from the screen that is not machine readable to machine readable form.

Figure 9:
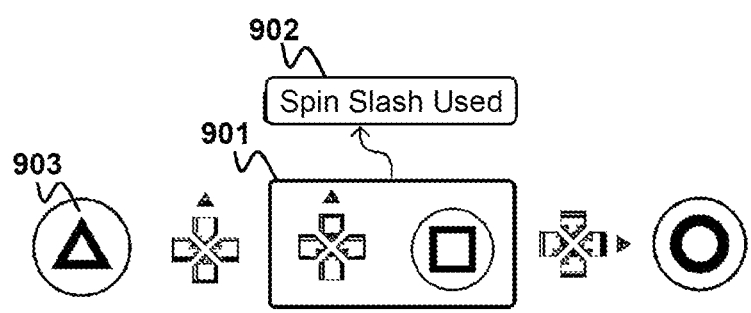
FIG. 9 is a diagram depicting an example of sequence recognition of unlabeled peripheral inputs data by the inference engine according to aspects of the present disclosure.

FIG. 9 is a diagram depicting an example of sequence recognition of unlabeled peripheral input data by one or more modules of the inference engine according to aspects of the present disclosure. The inference engine may be a multi-modal system which includes different modules which may include neural networks trained to recognize commands from unlabeled sequences of button presses. In some alternative implementations the one or more sequence recognition modules may use a look up table to flag input sequences, the sequence recognition module in this instance may utilize a time-based filter to differentiate between sequences of button presses.

As shown the peripheral input 903 to the inference engine may be a sequence of button presses. Each button press may have a unique value which differentiates each of the buttons. Seen here the peripheral inputs 903 are the buttons: circle, right arrow, square, up arrow, up arrow, triangle. From the inputs the sequence recognition module recognizes peripheral input sequence of square then up arrow 901 as being the command spin slash, thus the sequence recognition module outputs feature 902 representing that the spin slash command was used. Additionally, the sequence recognition module may also output the sequence of buttons 901 that triggered feature. While the above discusses button presses it should be understood that aspects of the present disclosure are not so limited and the button presses recognized by the sequence recognition module may include joystick movement directions, motion control movements, touch screen inputs, touch pad inputs and similar.

Figure 10:
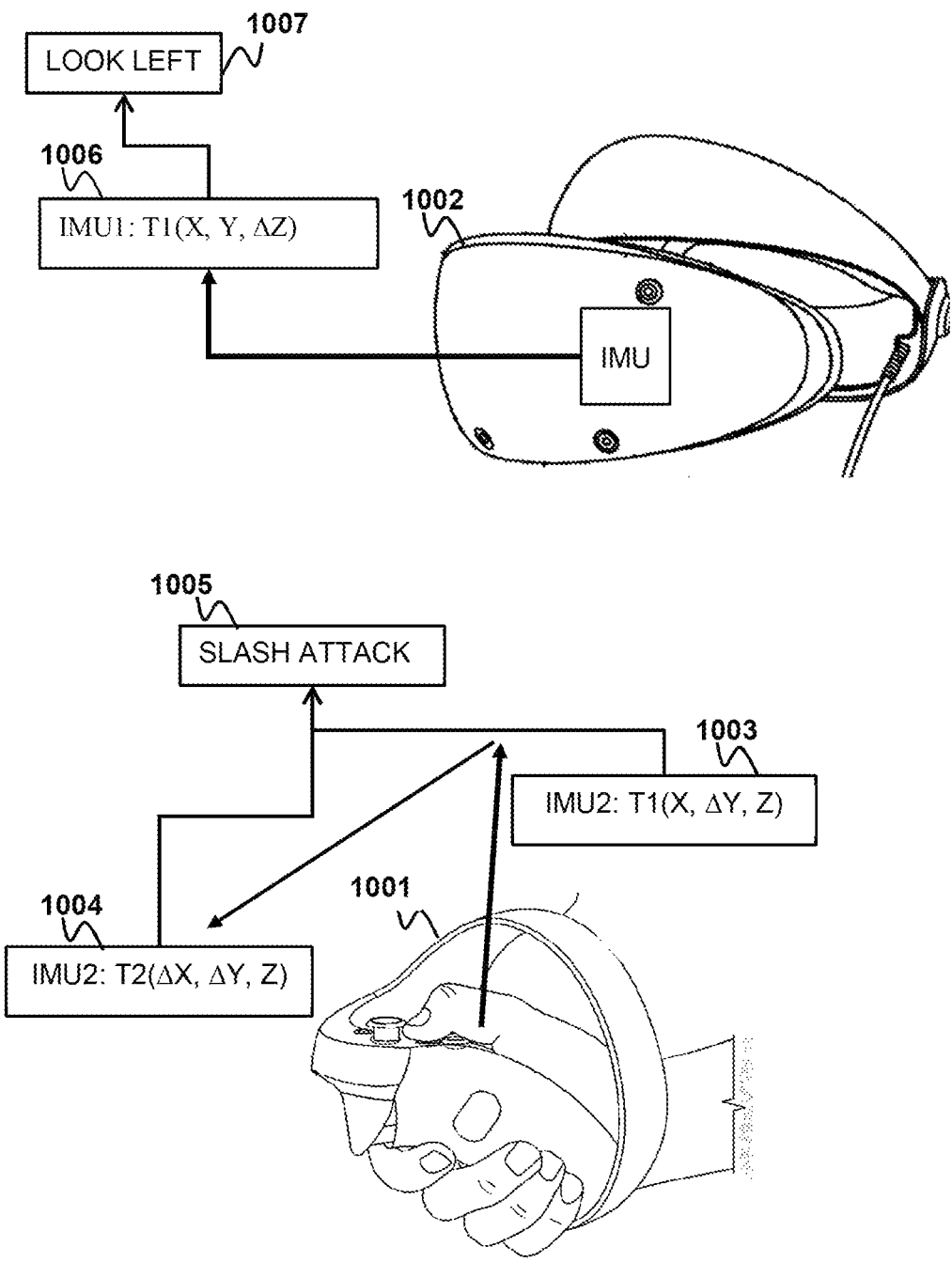
FIG. 10 is a diagram depicting an example of control classification of unlabeled motion inputs according to aspects of the present disclosure.

FIG. 10 is a diagram depicting an example of motion control classification of unlabeled motion inputs according to aspects of the present disclosure. In some implementations the inference engine may include one or more modules configured to classify unlabeled motion inputs. AS shown the system may have inertial measurement units (IMU)s located in a game controller 1001 and a heads-up display (HUD) 1002. The motion control classification module may be trained to differentiate between motion inputs from the HUD, the game controller and other motion devices or alternatively a separate motion control classification module may be used for each motion input device (controller, left VR foot controller, right VR foot controller, left VR hand controller, right VR hand controller, HUD etc.) in the system. As shown the output of the IMUs may be a time series of accelerations and angular velocities which may be processed to correspond to movements of the controller or HUD with respect to X, Y, and Z axes. In the illustrated example, the controller is moved first upward and the controller IMU2 outputs a first value 1003 corresponding to a change in the Y variable. The user then moves the controller in a downward diagonal direction and the IMU2 outputs a second acceleration value corresponding to changes the X and Y variables.

The motion control classification module may classify the combination of time series IMU outputs as a slash attack 1005 and outputs the classification as a feature. Additionally, the motional control classification module may output the time series motion input data along with the classification. The motion control classification module may additionally classify one off input instances as shown, the HUD IMU1 may output a single change in angular velocity about the Z axis 1006. The motion control classification module is trained to classify this change in angular velocity as a simple movement such as looking left 1007. The motion control classification module may output this look left feature and in some implementations the change in angular velocity may also be output.

Figure 12:
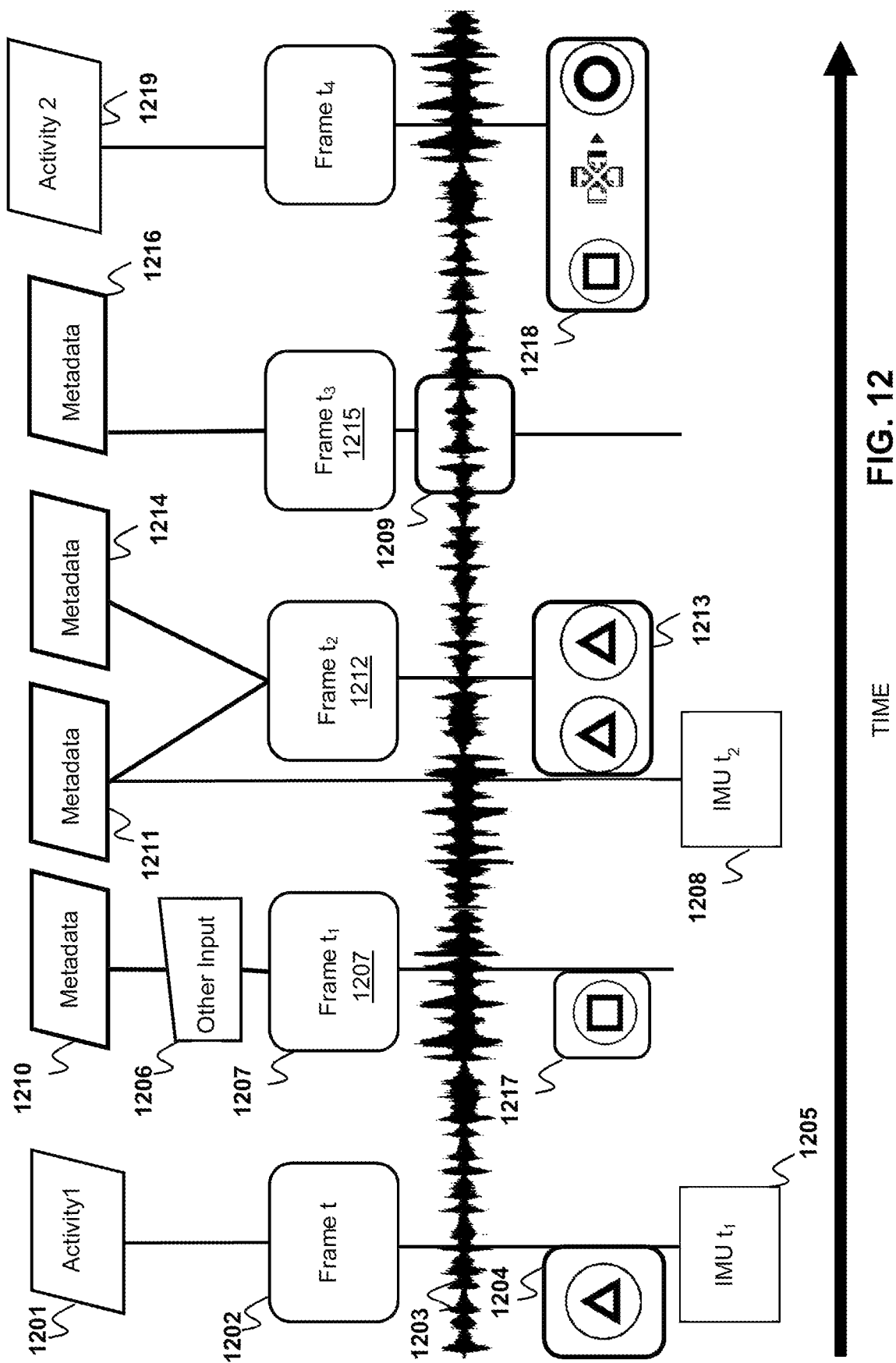
FIG. 12 is a diagram depicting an example of recognition of input events using correlation of unlabeled inputs with an inference engine according to aspects of the present disclosure.

FIG. 12 is a diagram depicting an example of recognition of input events using correlation of unlabeled inputs with an inference engine according to aspects of the present disclosure. In some implementations multimodal data processing may be used to further confirm predictions made by the inference engine. This can reduce processing time if a prediction in one data modality results in avoiding additional processing. As shown the inference engine may receive inputs from multiple modalities, including video/image frames 1202, audio data 1203, peripheral inputs 1204, and motion data 1205. The system may generate context information that includes activities 1201 and metadata 1210. The multi-modal fusion of different types of inputs allows for the discovery of correlated inputs which may provide enhanced functionality and a reduction in processing because less processing intensive indicators of events may be discovered. For example and without limitation, during training the system may be configured to recognize that a certain sound indicates 1209 that player has fired an arrow as such the screen data 1215 for the ammo count no longer needs to be processed because the system can wait for the sound and keep a count 1216 of the number of arrows shot. In another example shown the system may identify motion data 1208 indicating player motion and as such an image frame of the screen 1212 does not need to be examined to determine the direction a player in a game is facing 1211. In addition, the system may implement an ensemble model that can perform say the arrow count through both audio analysis as discussed above and image analysis to strengthen the arrow count prediction. In some implementations the inference engine may generate an internal game state representation that is updated with UDS data each time the multi-modal neural networks generated a classification. The inference engine may also use peripheral input to correlate game state changes for example a series of triangle button presses 1213 may be identified as corresponding to performing a dash attack as such image frames 1212 do not need to be classified to determine the activation of a dash attack and if the dash attack has a movement component player location does not need to be determined. Instead, the inference engine may simply update the context information 1214 with information corresponding to the dash attack. In another example, other input information 1206 may be used to determine game context information 1210 for example and without limitation the user may save a screenshot and upload it to social media 1206, the inference engine may correlate this to pausing the game and the inference engine may not have to classify peripheral inputs 1217 or image frames 1207 of the game screen 1207 to determine that the game is paused and update the game context 1210. Finally, the inference engine may identify certain peripheral input sequences 1218 that correspond to certain menu actions and update the activities 1219 based on the internal game state representation. For example and without limitation, the trained inference engine may determine that the peripheral input sequence 1218 circle, right arrow, square, corresponds to opening up a quest menu and selecting the next quest in a quest list. Thus, the activity 1219 may be updated by simply changing an internal representation of the game state to the next quest based on the identified input sequence. These are just some examples of the time coincident correlations that may be discovered and use of indirect prediction of game context by the inference engine.

Additionally, the inference engine may retain an internal game state and update the internal game state with each received and classified input. In some implementations the inference engine may receive game state updates from the UDS periodically or at an update interval. These game state updates may be generated by the game and sent periodically or at an interval to the UDS. The game state updates may be used by the inference engine to build the internal game state and update the internal game state. For example at the start of an Activity 1201 the activity data may be provided by the game to the UDS with initial meta data for the game state. While playing the game may not provide updates to the UDS and the inference engine may update the game state with metadata 1210, 1211, 1214, 1216 until the next game state update 1219. The game state update 1201, 1219 may reduce the amount of processing required because it may contain information that the inference engine can use to selectively disable modules. For example, the game context update may provide metadata that indicate that the game takes place in the Old West and does not contain any motorized vehicles as such modules trained for recognition of certain motorized vehicle sounds or motorized vehicle objects may be turned off. This saves processing power as the image and sound data does not need to be analyzed by those modules.

Figure 13:
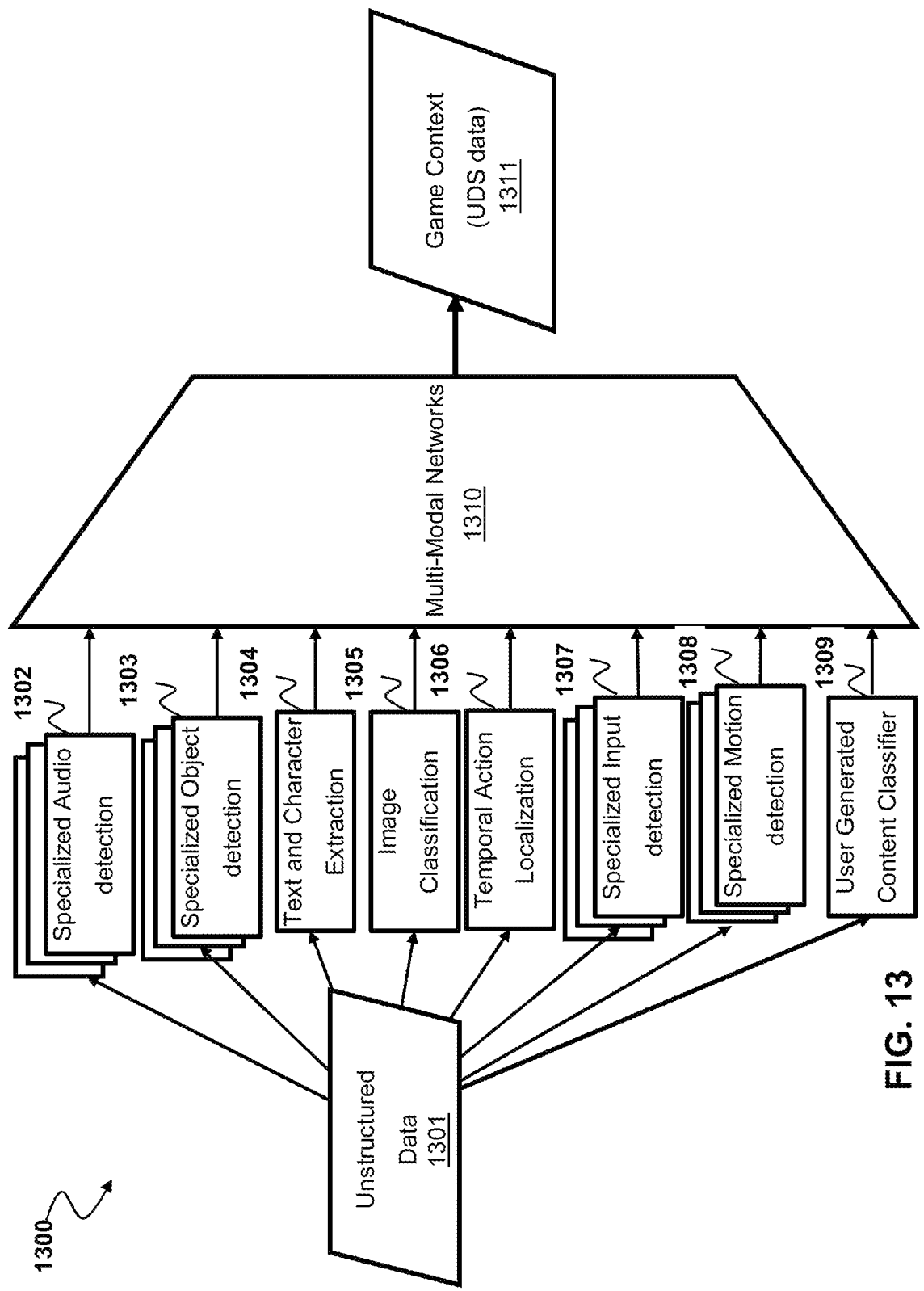
FIG. 13 is a diagram depicting an example layout of modal modules in a multi-modal recognition network of the inference engine according to aspects of the present disclosure.

FIG. 13 is a diagram depicting an example layout of unimodal modules in a multi-modal recognition network of the inference engine according to aspects of the present disclosure. As shown the inference engine includes one or more unimodal modules operating on different modalities of input information and a multi-modal module which receives information from the unimodal modules. In the implementation shown the inference engine 1300 includes the unimodal modules of; one or more audio detection modules 1302, one or more object detection modules 1303, a text and character extraction module 1304, an image classification module 1305, temporal action localization module 1306, one or more input detection modules 1307, one or more motion detection modules 1308, and a user generated content classifier 1309. The inference engine also includes a multimodal neural network module which takes the outputs of the unimodal modules and generates context information 1311 in the UDS format.

Audio Detection Modules

The one or more audio detection modules 1302 may include one or more neural networks trained to classify audio data. Additionally, the one or more audio detection modules may include audio pre-processing stages and feature extraction stages. The audio preprocessing stage may be configured to condition the audio for classification by one or more neural networks.

Pre-processing may be optional because audio data is received directly from the unstructured data 1301 and therefore would not need to be sampled and would ideally be free from noise. Nevertheless, the audio may be preprocessed to normalize signal amplitude and adjust for noise.

The feature extraction stage may generate audio features from the audio data to capture feature information from the audio. The feature extraction stage may apply transform filters to the pre-processed audio based on human auditory features such as for example and without limitation Mel Frequency cepstral coefficients (MFCCs) or based Spectral Feature of the audio for example short time Fourier transform. MFCC may provide a good filter selection for speech because human hearing is generally tuned for speech recognition additionally because most applications are designed for human use the audio may be configured for the human auditory system. Short Fourier Transform may provide more information about sounds outside the human auditory range and may be able to capture features of the audio lost with MFCC.

The extracted features are then passed to one or more of the audio classifiers. The one or more audio classifiers may be neural networks trained with a machine learning algorithm to classify events from the extracted features. The events may be game events such as gun shots, player death sounds, enemy death sounds, menu sounds, player movement sounds, enemy movement sounds, pause screen sounds, vehicle sounds, or voice sounds. In some implementations the audio detection module may speech recognition to convert speech into a machine-readable form and classify key words or sentences from the text. In some alternative implementations text generated by speech recognition may be passed to the text and character extraction module for further processing. According to some aspects of the present disclosure the classifier neural networks may be specialized to detect a single type of event from the audio. For example and without limitation, there may be a classifier neural network trained to only classify features corresponding to weapon shot sounds and there may be another classifier neural network to recognize vehicle sounds. As such for each event type there may be a different specialized classifier neural network trained to classify the event from feature data. Alternatively, a single general classifier neural network may be trained to classify every event from feature data. Or in yet other alternative implementations a combination of specialized classifier neural network and generalized classifier neural networks may be used. In some implementations the classifier neural networks may be application specific and trained off a data set that includes labeled audio samples from the application. In other implementations the classifier neural network may be a universal audio classifier trained to recognize events from a data set that includes labeled common audio samples. Many applications have common audio samples that are shared or slightly manipulated and therefore may be detected by a universal audio classifier. In yet other implementations a combination of universal and application specific audio classifier neural networks may be used. In either case the audio classification neural networks may be trained de novo or alternatively may be further trained from pre-trained models using transfer learning. Pre-trained models for transfer learning may include without limitation VGGish, Sound net, Resnet, Mobilenet. Note that for Resnet and Mobilenet the audio would be converted to spectrograms before classification.

In training the audio classifier neural networks, whether de novo or from a pre-trained module, the audio classifier neural networks may be provided with a dataset of game play audio. The dataset of gameplay audio used during training has known labels. The known labels of the data set are masked from the neural network at the time when the audio classifier neural network makes a prediction, and the labeled gameplay data set is used to train the audio classifier neural network with the machine learning algorithm after it has made a prediction as is discussed in the generalized neural network training section. In some implementations the universal neural network may also be trained with other datasets having known labels such as for example and without limitation real world sounds, movie sounds or YouTube video.

Object Detection Modules

The one or more object detection modules 1303 may include one or more neural networks trained to classify objects occurring within an image frame of video or an image frame of a still image. Additionally, the one or more object detection modules may include a frame extraction stage, an object localization stage, and an object tracking stage.

The frame extraction stage may simply take image frame data directly from the unstructured data. In some implementations the frame rate of video data may be down sampled to reduce the data load on the system. Additionally in some implementations the frame extraction stage may only extract key frames or I-frames if the video is compressed. In other implementations, only a subset of the available channels of the video may be analyzed. For example, it may be sufficient to analyze only the luminance (brightness) channel of the video but not the chrominance (color) channel. Access to the full unstructured data also allows frame extraction to discard or use certain rendering layers of video. For example and without limitation, the frame extraction stage may extract the UI layer without other video layers for detection of UI objects or may extract non UI rendering layers for object detection within a scene.

The object localization stage identifies features within the image. The object localization stage may use algorithms such as edge detection or regional proposal. Alternatively, the neural network may include deep learning layers that are trained to identify features within the image may be utilized.

The one or more object classification neural networks are trained to localize and classify objects from the identified features. The one or more classification neural networks may be part of a larger deep learning collection of networks within the object detection module. The classification neural networks may also include non-neural network components that perform traditional computer vision tasks such as template matching based on the features. The objects that the one or more classification neural networks are trained to localize and classify includes for example and without limitation, Game icons such as; player map indicator, map location indictor (Points of interest); item icons, status indicators, menu indicators, save indicators, and character buff indicators, UI elements such as health level, mana level, stamina level, rage level, quick inventory slot indicators, damage location indicators, UI compass indicators, lap time indicators, vehicle speed indicators, and hot bar command indicators, application elements such as weapons, shields, armors, enemies, vehicles, animals, trees, and other interactable elements.

According to some aspects of the present disclosure the one or more object classifier neural networks may be specialized to detect a single type of object from the features. For example and without limitation, there may be object classifier neural network trained to only classify features corresponding to weapons and there may be another classifier neural network to recognize vehicles. As such for each object type there may be a different specialized classifier neural network trained to classify the object from feature data. Alternatively, a single general classifier neural network may be trained to classify every object from feature data. Or in yet other alternative implementations a combination of specialized classifier neural network and generalized classifier neural networks may be used. In some implementations the object classifier neural networks may be application specific and trained off a data set that includes label audio samples from the application. In other implementations the classifier neural network may be a universal object classifier trained to recognize objects from a data set that includes labeled frames containing common objects. Many applications have common objects that are shared or slightly manipulated and therefore may be detected by a universal object classifier. In yet other implementations a combination of universal and application specific object classifier neural networks may be used. In either case the object classification neural networks may be trained de novo or alternatively may be further trained from pre-trained models using transfer learning. Pre-trained models for transfer learning may include without limitation Faster R-CNN (Region-based convolutional neural network), YOLO (You only look once), SSD (Single shot detector), and Retinanet.

Frames from the application may be still images or may be part of a continuous video stream. If the frames are part of a continuous video stream the object tracking stage may be applied to subsequent frames to maintain consistency of the classification over time. The object tracking stage may apply known object tracking algorithms to associate a classified object in a first frame with an object in a second frame based on for example and without limitation the spatial temporal relation of the object in the second frame to the first and pixel values of the object in the first and second frame.

In training the object detection neural networks, whether de novo or from a pre-trained model, the object detection classifier neural networks may be provided with a dataset of game play video. The dataset of gameplay video used during training has known labels. The known labels of the data set are masked from the neural network at the time when the object classifier neural network makes a prediction, and the labeled gameplay data set is used to train the object classifier neural network with the machine learning algorithm after it has made a prediction as is discussed in the generalized neural network training section. In some implementations the universal neural network may also be trained with other datasets having known labels such as for example and without limitation real world images of objects, movies or YouTube video.

Text and Character Extraction

Text and character extraction are similar tasks to object recognition but it is simpler and the scope is narrower. The text and character extraction module 1304 may include a video preprocessing component, text detection component and text recognition component.

The video preprocessing component may modify the frames or portions of frames to improve recognition of text. For example and without limitation, the frames may be modified by preprocessing de-blurring, de-noising and contrast enhancement.

Text detection components are applied to frames and configured to identify regions that contain text. Computer vision techniques such as edge detection and connected component analysis may be used by the text detection components. Alternatively, text detection may be performed by a deep learning neural network trained to identify regions containing text.

Low level Text recognition may be performed by optical character recognition. The recognized characters may be assembled into words and sentences. Higher level text recognition provides assembled words and sentences with context. A dictionary may be used to look up and tag contextually important words and sentences. Alternatively, a neural network may be trained with a machine learning algorithm to classify contextually important words and sentences. For example and without limitation, the text recognition neural networks may be trained to recognize words for game weapons, armor, shields, trees, animals, vehicles, enemies, locations, landmarks, distances, times, dates, menu settings, items, questions, quests, and achievements. Similar to above, the text recognition neural network or dictionary may be universal and shared between applications or specialized for each application or a combination of the two.

In training the high-level text recognition neural networks may be trained de novo or using transfer learning from a pretrained neural network. Pretrained neural networks that may be used with transfer learning include for example and without limitation Generative Pretrained Transformer (GPT) 2, GPT 3, GPT 4, Universal Language Model Fine-Tuning (ULMFiT), Embeddings from Language Models (ELMo), Bidirectional Encoder Representations from Transformers (BERT) and similar. Whether de novo or from a pre-trained model, the high-level Text recognition neural networks may be provided with a dataset of gameplay text. The dataset of gameplay text used during training has known labels. The known labels of the data set are masked from the neural network at the time when the high level text recognition neural network makes a prediction, and the labeled gameplay data set is used to train the high level text recognition neural network with the machine learning algorithm after it has made a prediction as is discussed in the generalized neural network training section. In some implementations the universal neural network may also be trained with other datasets having known labels such as for example and without limitation real world images of text, books or websites.

Image Classification

The Image classification module 1305 classifies the entire image of the screen whereas object detection decomposes elements occurring within the image frame. The task of image classification is similar to object detection except it occurs over the entire image frame without an object localization stage and with a different training set. An image classification neural network may be trained to classify contextually important image information from an entire image. Contextually important information generated from the entire image may be for example, whether the image scene is day or night, whether the image is a game inventory screen, menu screen, character screen, map screen, statistics screen, etc. Some examples of pre-trained image recognition models that can be used for transfer learning include, but are not limited to, VGG, ResNet, EfficientNet, DenseNet, MobileNet, ViT, GoogLeNet, Inception, and the like.

The image classification neural networks may be trained de novo or trained using transfer learning from a pretrained neural network. Whether de novo or from a pre-trained module, the image classification neural networks may be provided with a dataset of gameplay image frames. The dataset of gameplay image frames used during training has known labels. The known labels of the data set are masked from the neural network at the time when the image classification neural network makes a prediction, and the labeled gameplay data set is used to train the image classification neural network with the machine learning algorithm after it has made a prediction as is discussed in the generalized neural network training section. In some implementations the universal neural network may also be trained with other datasets having known labels such as for example and without limitation images of the real world, videos of gameplay or game replays.

Temporal Action Localization

Context information may include for example and without limitation, special moves, attacks, defense, and movements which are typically made up of a series of time localized movements within a series of image frames of a video. As such a temporal action localization module 1306 may localize and classify movements occurring within the image frames of application data to generate movement context information.

The temporal action localization module may include a frame preprocessing component, feature extraction component, action proposal generation component, action classification component and Localization component.

The frame preprocessing component may take sequences of image frames as data directly from the unstructured data. Access to the full unstructured data also allows frame extraction to discard or use certain rendering layers of video. For example, frame preprocessing may extract non-UI rendering layers for object detection within a scene. Additionally, the preprocessing component may alter the image frames to improve detection for example and without limitation the frames may have their orientation and color normalized.

The feature extraction component may be a neural network component of the temporal localization module. The feature extraction component may have a series of convolutional layers and pooling neural network layers trained to extract low level and high-level features from video. The feature extraction component may be a pre-trained network, trained to extract low level and high-level features from image frames of a video without the need for further training. In some implementations, it may be desirable to train the feature extraction component from scratch.

The action proposal generation component breaks a sequence of image frames in the video into more processable space. In one implementation a sliding overlapping window may be used to extract features over each image frame in the sequence of images frame of the video data. In another implementation features may be taken from each image frame for a limited window of frames (i.e., a limited time period) in the video. Each window of frames may be overlapping in time as such this may be thought of as a sliding temporal window. In yet another implementation a non-overlapping windows may be used.

The action classification component may include one or more neural networks trained to classify actions occurring within the window of extracted features provided by the action proposal component. The action classification component may include a different trained neural network for each of the different movements or movement types that are to be detected. The one or more action classification modules may be universal and shared between applications or may be specially trained for each application or a combination of both.

In training the action classification neural networks may be trained de novo or using transfer learning from a pre-trained neural network. Whether de novo or from a pre-trained module, the action classification neural networks may be provided with a dataset containing a sequence of gameplay image frames. The dataset of gameplay image frames used during training has known labels of actions. The known labels of the data set are masked from the neural network at the time when the action classification neural network makes a prediction, and the labeled gameplay data set is used to train the action classification neural network with the machine learning algorithm after it has made a prediction as is discussed in the generalized neural network training section. The specialized neural network may have a data set including only videos or gameplay or game replays of the specific application, this may create a neural network that is good at predicting actions for a single application. In some implementations the universal neural network may also be trained with other datasets having known labels such as for example and without limitation videos of actions across many applications, actual game play of many applications or game replays of many applications.

After classification, the classification of the action is passed to the localization component which combines the classified action with the segments that were classified. The resulting combined information is then passed as a feature to the multi-modal neural networks.

Input Detection

The unstructured dataset 1301 may include inputs from peripheral devices. The input detection module 1307 may take the inputs from the peripheral devices and identify the inputs. In some implementations the input detection module 1307 may include a table containing commands for the application and output a label identifying the command when a matching input is detected. Alternatively, the input detection module may include one or more input classification neural networks trained to recognize commands from the peripheral inputs in the unstructured data. Some inputs are shared between applications for example and without limitation, many applications used a start button press for pausing the game and opening a menu screen and a select button press to open a different menu screen. Thus, according to some aspects of the present disclosure one or more of the input detection neural networks may be universal and shared between applications. In some implementations the one or more input classification neural networks may be specialized for each application and trained on a data set consisting of commands for the specific chosen application. In yet other implementations a combination of universal and specialized neural networks are used. Additionally in alternative implementations the input classification neural networks may be highly specific with a different trained neural network to identify each command for the context data. Context data may include commands that include for example and without limitation, pause commands, menu commands, movement commands, action commands, and selection commands.

The input classification neural networks may be provided with a dataset including peripheral inputs occurring during use of the computer system. The dataset of peripheral inputs used during training have known labels for commands. The known labels of the data set are masked from the neural network at the time when the input classification neural network makes a prediction, and the labeled data set of peripheral inputs is used to train the input classification neural network with the machine learning algorithm after it has made a prediction as is discussed in the generalized neural network training section. A specialized input classification neural network may have a data set that consists of recordings of inputs sequences that occur during operation of a specific application and no other applications, this may create a neural network that is good at predicting actions for a single application. In some implementations, a universal input classification neural network may also be trained with other datasets having known labels such as for example and without limitation input sequences across many different applications. In situations where available transfer learning models for processing peripheral inputs are limited or otherwise unsatisfactory, a "pre-trained" model may be developed that can process peripheral inputs for a particular game or other application. This pre-trained model may then be used for transfer learning for other games or applications.

Motion Detection

Many applications also include a motion component in the unstructured data 1301 set that may provide commands which could be included in context information. The motion detection module 1308 may take the motion information from the unstructured data 1301 and turn the motion data into commands for the context information. A simple approach to motion detection may include simply providing different thresholds and outputting a command each time an element from an inertial measurement unit exceeds the threshold. For example and without limitation, the system may include a 2 gravity acceleration threshold in the X axis to output a command that the headset is changing direction. Another alternative approach is neural network based motion classification. In this implementation the motion detection module may include the components of motion preprocessing, feature selection and motion classification.

The motion preprocessing component conditions the motion data to remove artifacts and noise from the data. The preprocessing may include noise floor normalization, mean selection, standard deviation evaluation, Root mean square torque measurement, and spectral entropy signal differentiation.

The feature selection component takes preprocessed data and analyzes the data for features. Selecting features using techniques for example and without limitation principal component analysis, correlational analysis, sequential forward selection, backwards elimination and mutual information.

Finally, the selected features are applied to the motion classification neural networks trained with a machine learning algorithm to classify commands from motion information. In some implementations the selected features are applied to other machine learning models which do not include a neural network for example and without limitation, decision trees, random forests, and support vector machines. Some inputs are shared between applications for example and without limitation, many applications selection commands are simple commands to move a cursor. Thus, according to some aspects of the present disclosure one or more of the motion classification neural networks may be universal and shared between applications. In some implementations the one or more motion classification neural networks may be specialized for each application and trained on a data set consisting of commands for the specific chosen application. In yet other implementation a combination of universal and specialized neural networks are used. Additionally in alternative implementations the motion classification neural networks may be highly specific with a different trained neural network to identify each command for the context data.

The motion classification neural networks may be provided with a dataset including motion inputs occurring during use of the computer system. The dataset of motion inputs used during training has known labels for commands. The known labels of the data set are masked from the neural network at the time when the motion classification neural network makes a prediction, and the labeled data set of motion inputs is used to train the motion classification neural network with the machine learning algorithm after it has made a prediction as is discussed in the generalized neural network training section. A specialized motion classification neural network may have a data set that consists of recordings of inputs sequences that occur during operation of a specific application and no other application, this may create a neural network that is good at predicting actions for a single application. In some implementations a universal motion classification neural network may also be trained with other datasets having known labels such as for example and without limitation input sequences across many different applications.

User Generated Content Classification

The system may also be configured to classify elements occurring within user generated content. As used herein user generated content may be data generated by the user on the system coincident with use of the application. For example and without limitation, user generated content may include chat content, blog posts, social media posts, screen shots, user generated documents. The User Generated Content Classification module 1309 may include component from other modules such as the text and character extraction module and the object detection module to place the user generated content in a form that may be used as context data. For example and without limitation, the User Generated Content Classification may decompose text and character extraction components to identify contextually important statements made by the user in a chat room. As a specific, non-limiting example the user may make a statement in chat such as 'pause' or 'bio break' which may be detected and used as meta data indicating the user is paused, on a break or do not disturb. As another example, the User Generated Content Classification module 1309 may identify moments the user chooses to grab a screenshot. Such moments are likely to be of significance to the user. Screen shots of such moments may be analyzed and classified with labels, e.g., "winning a trophy" or "setting a game record" and the labels may be used as a metadata.

Multi-Modal Networks

The multi-modal networks 1310 fuse the information generated by the modules 1302-1309 and generates structured game context information 1311 from the separate modal networks of the modules. In some implementations the data from the separate modules are concatenated together to form a single multi-modal vector. The multi-modal vector may also include unprocessed data from unstructured data.

The multi-modal neural networks 1310 may be trained with a machine learning algorithm to take the multi-modal vector and generate structured Game context data in the form of UDS data 1311. Training the multi-modal neural networks 1310 may include end to end training of all of the modules with a data set that includes labels for multiple modalities of the input data. During training the labels of the multiple input modalities are masked from the multi-modal neural networks before prediction. The labeled data set of multi-modal inputs is used to train the multi-modal neural networks with the machine learning algorithm after it has made a prediction as is discussed in the generalized neural network training section.

Figure 14:
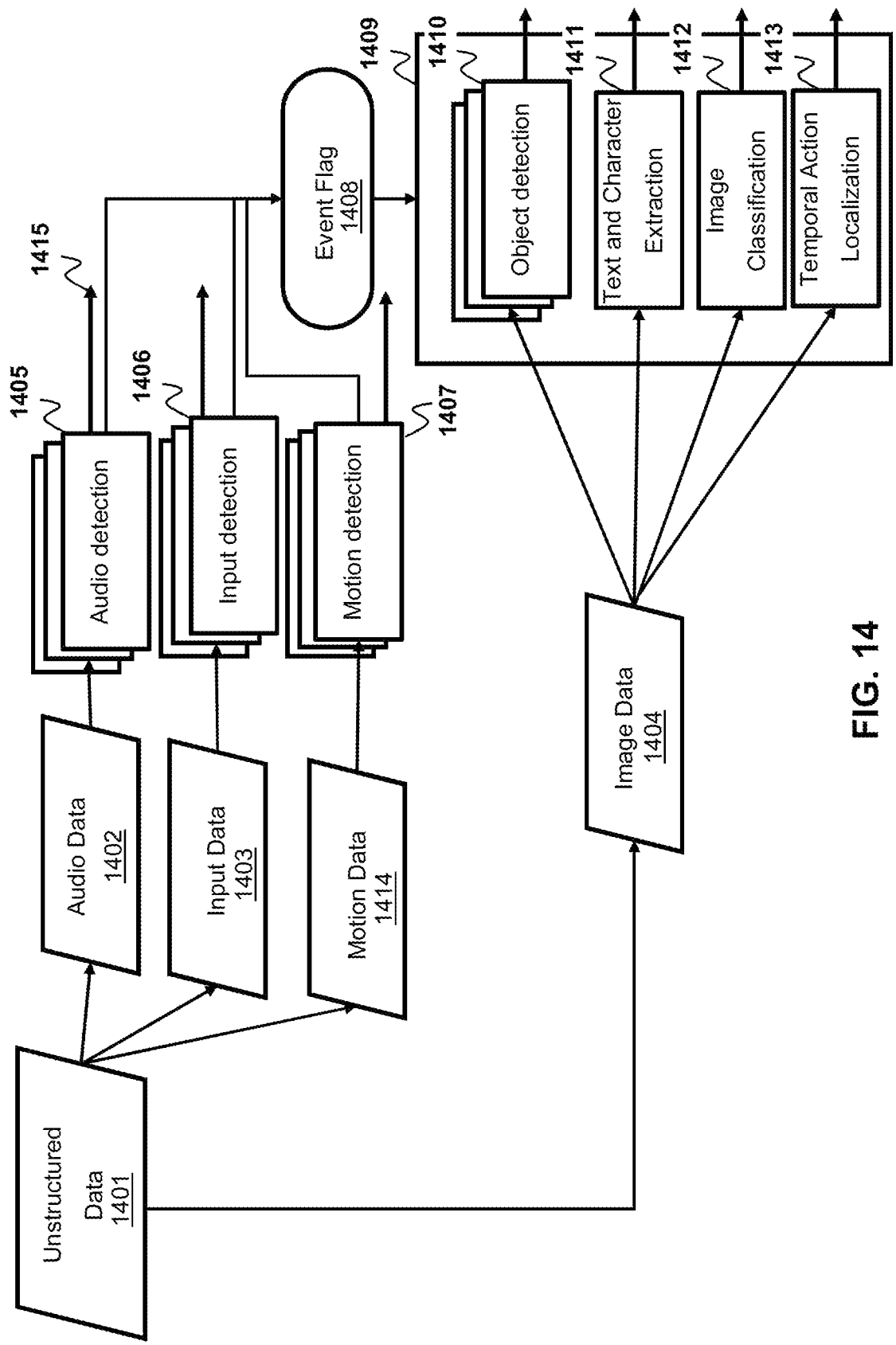
FIG. 14 is a diagram depicting an example of an implementation of hierarchical activation of modal modules in a multi-modal recognition network of the inference engine according to aspects of the present disclosure.

FIG. 14 is a diagram depicting an example implementation of hierarchical activation of unimodal modules in a multi-modal recognition network of the inference engine according to aspects of the present disclosure. Image processing is a processor intensive operation and therefore it would be advantageous to reduce the amount of image processing performed on image data 1404 from the unstructured data 1401. To that end the system shown in FIG. 14 may be used to selective process image frames based on other data such as audio data 1402, peripheral input data 1403 and motion input data 1414. A classification made by the audio detection module 1405, input detection module 1406, motion detection module or any combination thereof may reveal that there is an important image frame or frame that should be processed. This raises an event flag 1408 which enables the image processing modules 1409. The image processing modules including the object detection module 1410, text and character extraction module 1411, image classification module 1412, and temporal action localization module 1413 process the image data starting at the point the event flag was triggered. Each module then passes its output 1415 to a multimodal neural network as shown in FIG. 13.

This system may for example and without limitation raise an event flag when audio classified as a map screen sound appears in the audio data or when a button corresponding to the game inventor screen is pushed on the controller or when a motion input corresponding to a menu command is in input data. In this way the system may reduce processor resource intensive operations such as image processing.

Context State Updates

Figure 17:
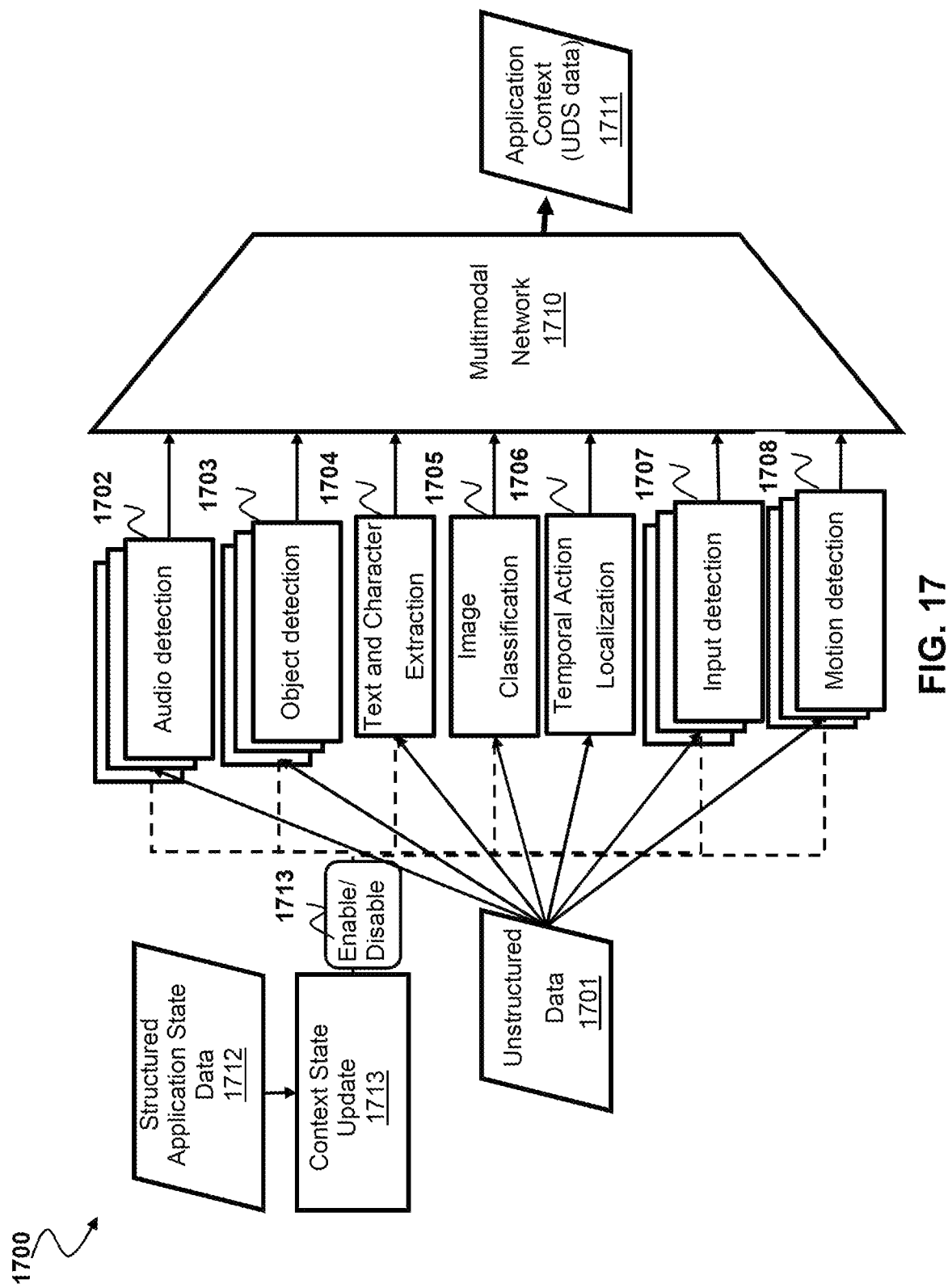
FIG. 17 is a block diagram depicting an example layout of unimodal modules in a multi-modal recognition network of the inference engine with context updates according to aspects of the present disclosure.

Aspects of the present disclosure include systems for interpolation of application context between application state updates. FIG. 17 is a diagram depicting an example layout of such a system having unimodal modules in a multi-modal recognition network of the inference engine with context updates according to aspects of the present disclosure. As shown, the unimodal modules include one or more audio detection modules 1702, one or more object detection modules 1703, a text and character extraction module 1704, an image classification module 1705, a temporal action localization module 1706, one or more input detection modules 1707, and one or more motion detection modules 1708. The multimodal neural network 1710 takes one or more unimodal features generated by the one or more unimodal modules and outputs application context data 1711. Additionally in the implementation shown the inference engine 1700 is provided structured application state data 1712. The structured application state data 1712 may be from the UDS in the UDS data structure or from the application or a combination of the UDS system and the application. The structured application state data 1712 may be received by a context state update module 1713. The context state update module determines from structured application state data one or more irrelevant unimodal modules. Here, an irrelevant unimodal module is a module configured to work on, classify, detect, or extract information not within the unstructured data. The context state update module uses the structured application state data to determine what information may be found within the unstructured data. The context state update module may include a look up table that correlates information in the structured application data with information that will not be in the unstructured data and a corresponding unimodal module. Alternatively, the context state update module may include a neural network trained with a machine learning algorithm to predict one or more irrelevant unimodal modules. In yet another alternative implementation both a look up table and a trained neural network may be used. Once one or more irrelevant unimodal modules is determined a disable signal or deactivate signal 1713 is sent to the unimodal modules that were determined to be irrelevant. The unimodal modules 1702, 1703, 1704, 1705, 1706, 1707, 1708 are configured to stop operation on unstructured application state data when they receive the disable or deactivate signal and are thus inactive. One or more unimodal modules that do not receive the disable signal 1713 remain active and operate on the unstructured data 1701. The deactivated unimodal modules may output placeholder feature information that indicates no feature was found without processing the unstructured data or may simply output no feature information. Each time structured context information is received the Context State update module may send an enable signal to all of the unimodal modules, determine irrelevant modules and then send a disable signal to the irrelevant modules.

As discussed above irrelevant unimodal modules are modules configured to work on, classify, detect, or extract information not within unstructured data. For example and without limitation, an irrelevant unimodal module may be a motion input module when it is determined from the structured application state data that the unstructured application data does not include data corresponding to motion inputs and as such the motion input module does not have any unstructured input data. In another example without limitation, irrelevant modules may include one or more audio detection modules trained to detect irrelevant sounds and the irrelevant sounds are data corresponding to sounds not within the unstructured application state data. The Context state update module determines from the structured application state data that data corresponding to the irrelevant sounds are not within the unstructured data. To illustrate this, an audio detection module may be trained to detect and classify aircraft sounds but the structured application state data shows that the application is set in the Roman times as such the unstructured application state data is determined to not contain gun sounds and the audio detection module configured to detect aircraft sounds is therefore an irrelevant module.

In yet another non-limiting example, irrelevant modules may include a text and character extraction module that is trained to generate machine readable text from image frames containing text or characters and the unstructured application data does not include text or characters. The context state update module may analyze the structured application state data to determine if the unstructured data will contain text or characters. To illustrate this, the application state may be part of a puzzle that uses pictograms instead of text. As such, the unstructured data may be determined by the context state update module not to have machine readable text contained within image frames and therefore the text and character extraction module is an irrelevant module.

In a further non-limiting example, an irrelevant module may be an object detection module trained to classify a first object type and wherein it is determined from structured application data that the unstructured application data does not contain any data corresponding to the first object type. By way of illustration and not limitation the one or more object detection modules may include an object detection module configured to detect cars and it may be determined from the structured application state data by the context state update modules that the setting of the application is in Roman times as such there are no car objects in image frames in the unstructured data and therefore the object detection modules configured to detect car type objects is an irrelevant module.

In a final non-limiting example, irrelevant modules may include a temporal action localization module trained to classify and localize and action occurring within a sequence of image frames, and wherein it is determined from the structured data that the unstructured data does not contain a localizable action. As an illustration, the application may be a text based adventure application with frames that do not contain any actions. The context state update module may examine the structured application state data and determine from the structured data that the application is text based and does not include actions within image frames of the unstructured data as such the temporal action localization module is determined to be an irrelevant module.

The Context State Update module 1713 may include a neural network trained with a machine learning algorithm to determine one or more irrelevant modules from the Structured application state data. During training the Context State update module may be trained with training data that has labels that are masked during training. The labeled training data may include Structured application data that is labeled with one or more irrelevant modules. Context state update neural network module predicts one or more modules that are irrelevant modules with the masked training data and then trained with the labeled training data. For further discussion on training see the general neural network training section above.

Generalized Neural Network Training

The NNs discussed above may include one or more of several different types of neural networks and may have many different layers. By way of example and not by way of limitation the neural network may consist of one or multiple convolutional neural networks (CNN), recurrent neural networks (RNN) and/or dynamic neural networks (DNN). The Motion Decision Neural Network may be trained using the general training method disclosed herein.

By way of example, and not limitation, FIG. 15A depicts the basic form of an RNN that may be used, e.g., in the trained model. In the illustrated example, the RNN has a layer of nodes 1520, each of which is characterized by an activation function S, one input weight U, a recurrent hidden node transition weight W, and an output transition weight V. The activation function S may be any non-linear function known in the art and is not limited to the (hyperbolic tangent (tanh) function. For example, the activation function S may be a Sigmoid or ReLu function. Unlike other types of neural networks, RNNs have one set of activation functions and weights for the entire layer. As shown in FIG. 15B, the RNN may be considered as a series of nodes 1520 having the same activation function moving through time T and T+1. Thus, the RNN maintains historical information by feeding the result from a previous time T to a current time T+1.

In some implementations, a convolutional RNN may be used. Another type of RNN that may be used is a Long Short-Term Memory (LSTM) Neural Network which adds a memory block in a RNN node with input gate activation function, output gate activation function and forget gate activation function resulting in a gating memory that allows the network to retain some information for a longer period of time as described by Hochreiter & Schmidhuber "Long Short-term memory" Neural Computation 9(8):1735-1780 (1997), which is incorporated herein by reference.

FIG. 15C depicts an example layout of a convolution neural network such as a CRNN, which may be used, e.g., in the trained model according to aspects of the present disclosure. In this depiction, the convolution neural network is generated for an input 1532 with a size of 4 units in height and 4 units in width giving a total area of 16 units. The depicted convolutional neural network has a filter 1533 size of 2 units in height and 2 units in width with a skip value of 1 and a channel 1536 of size 9. For clarity in FIG. 15C only the connections 1534 between the first column of channels and their filter windows is depicted. Aspects of the present disclosure, however, are not limited to such implementations. According to aspects of the present disclosure, the convolutional neural network may have any number of additional neural network node layers 1531 and may include such layer types as additional convolutional layers, fully connected layers, pooling layers, max pooling layers, local contrast normalization layers, etc. of any size.

Figure 15D:
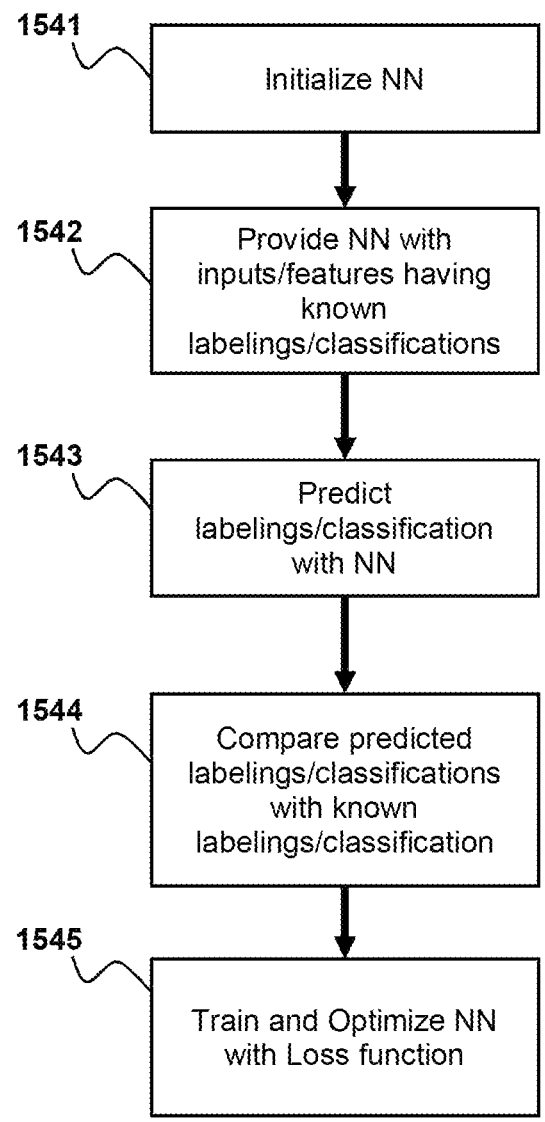
FIG. 15D is a block diagram of a method for training a neural network that is part of the multimodal processing according to aspects of the present disclosure.

As seen in FIG. 15D Training a neural network (NN) begins with initialization of the weights of the NN at 1541. In general, the initial weights should be distributed randomly. For example, an NN with a tanh activation function should have random values distributed between $$-\frac{1}{\sqrt{n}} \text{ and } \frac{1}{\sqrt{n}}$$

where n is the number of inputs to the node.

After initialization, the activation function and optimizer are defined. The NN is then provided with a feature vector or input dataset at 1542. Each of the different features vectors that are generated with a unimodal NN may be provided with inputs that have known labels. Similarly, the multimodal NN may be provided with feature vectors that correspond to inputs having known labeling or classification. The NN then predicts a label or classification for the feature or input at 1543. The predicted label or class is compared to the known label or class (also known as ground truth) and a loss function measures the total error between the predictions and ground truth over all the training samples at 1544. By way of example and not by way of limitation the loss function may be a cross entropy loss function, quadratic cost, triplet contrastive function, exponential cost, etc. Multiple different loss functions may be used depending on the purpose. By way of example and not by way of limitation, for training classifiers a cross entropy loss function may be used whereas for learning pre-trained embedding a triplet contrastive function may be employed. The NN is then optimized and trained, using the result of the loss function and using known methods of training for neural networks such as backpropagation with adaptive gradient descent etc., as indicated at 1545. In each training epoch, the optimizer tries to choose the model parameters (i.e., weights) that minimize the training loss function (i.e., total error). Data is partitioned into training, validation, and test samples.

During training, the Optimizer minimizes the loss function on the training samples. After each training epoch, the model is evaluated on the validation sample by computing the validation loss and accuracy. If there is no significant change, training can be stopped, and the resulting trained model may be used to predict the labels of the test data.

Thus, the neural network may be trained from inputs having known labels or classifications to identify and classify those inputs. Similarly, a NN may be trained using the described method to generate a feature vector from inputs having a known label or classification. While the above discussion is relation to RNNs and CRNNS the discussions may be applied to NNs that do not include Recurrent or hidden layers.

Figure 16:
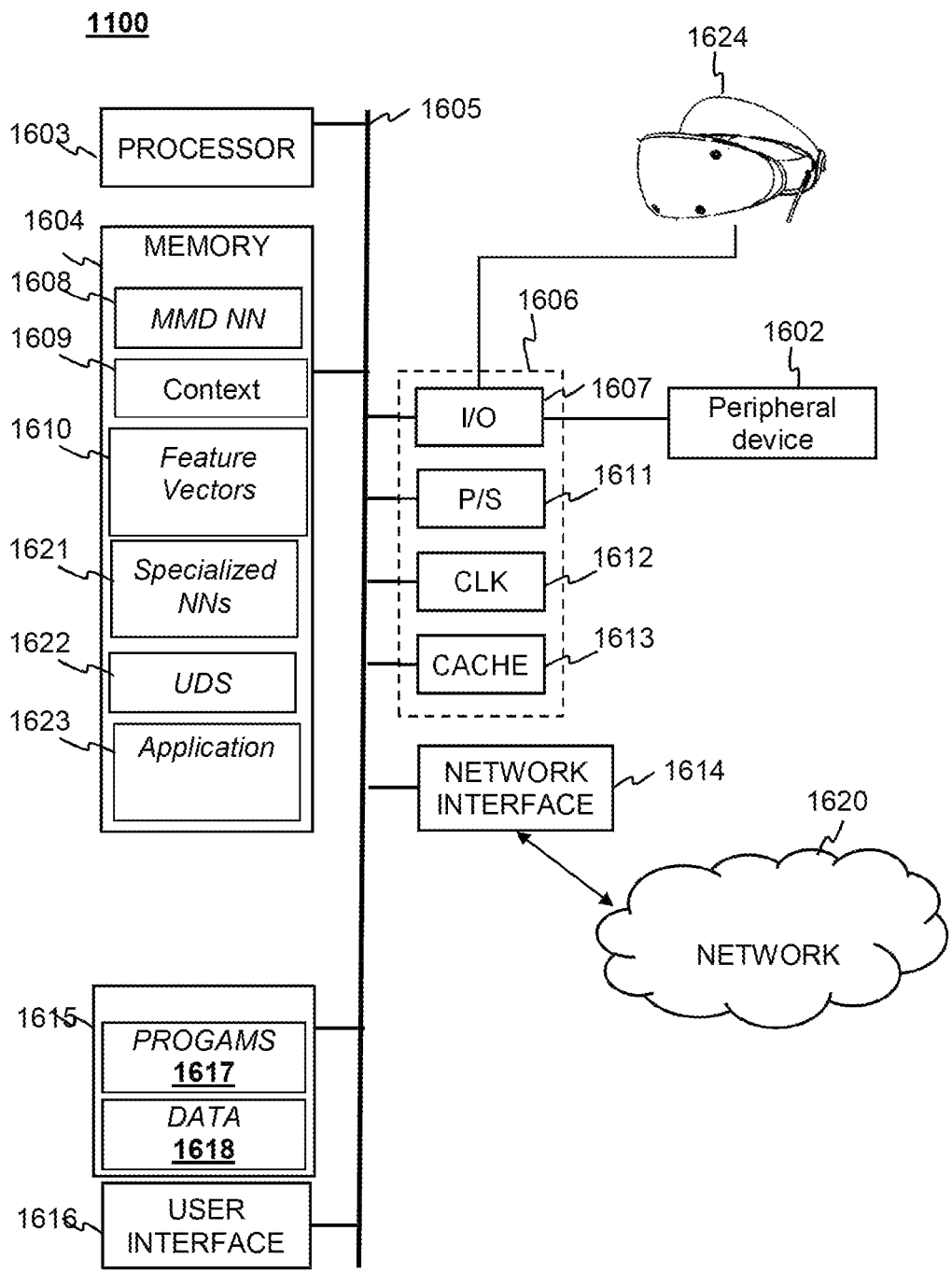
FIG. 16 is a block diagram of a system implementing the inference engine generating context according to aspects of the present disclosure.

FIG. 16 depicts a system according to aspects of the present disclosure. The system may include a computing device 1600 coupled to a user peripheral device 1602 and a HUD 1624. The peripheral device 1602 may be a controller, touch screen, microphone or other device that allows the user to input speech data in to the system. The HUD 1624 may be a Virtual Reality (VR) headset, Altered Reality (AR) headset or similar. The HUD may include one or more IMUs which may provide motion information to the system. Additionally, the peripheral device 1602 may also include one or more IMUs.

The computing device 1600 may include one or more processor units and/or one or more graphical processing units (GPU) 1603, which may be configured according to well-known architectures, such as, e.g., single-core, dual-core, quad-core, multi-core, processor-coprocessor, cell processor, and the like. The computing device may also include one or more memory units 1604 (e.g., random access memory (RAM), dynamic random-access memory (DRAM), read-only memory (ROM), and the like).

The processor unit 1603 may execute one or more programs, portions of which may be stored in memory 1604 and the processor 1603 may be operatively coupled to the memory, e.g., by accessing the memory via a data bus 1605. The programs may be configured to implement training of a multimodal NN 1608. Additionally, the Memory 1604 may contain programs that implement training of a NN configured to generate feature vectors 1610. The memory 1604 may also contain software modules such as a multimodal neural network module 1608, the UDS system 1622 and Specialized NN Modules 1621. The multimodal neural network module and specialized neural network modules are components of the inference engine. The Memory may also include one or more applications 1623, context information 1609 generated by one or more of the application or the multimodal NN of the inference engine. The overall structure and probabilities of the NNs may also be stored as data 1618 in the Mass Store 1615. The processor unit 1603 is further configured to execute one or more programs 1617 stored in the mass store 1615 or in memory 1604 which cause the processor to carry out a method for training a NN from feature vectors 1610 and/or input data. The system may generate Neural Networks as part of the NN training process. These Neural Networks may be stored in memory 1604 as part of the Multimodal NN Module 1608, or Specialized NN Modules 1621. Completed NNs may be stored in memory 1604 or as data 1618 in the mass store 1615. The programs 1617 (or portions thereof) may also be configured, e.g., by appropriate programming, to decode encoded video and/or audio, or encode, un-encoded video and/or audio or manipulate one or more images in an image stream stored in the buffer 1609.

The computing device 1600 may also include well-known support circuits, such as input/output (I/O) 1107, circuits, power supplies (P/S) 1611, a clock (CLK) 1612, and cache 1613, which may communicate with other components of the system, e.g., via the bus 1605. The computing device may include a network interface 1614. The processor unit 1103 and network interface 1614 may be configured to implement a local area network (LAN) or personal area network (PAN), via a suitable network protocol, e.g., Bluetooth, for a PAN. The computing device may optionally include a mass storage device 1615 such as a disk drive, CD-ROM drive, tape drive, flash memory, or the like, and the mass storage device may store programs and/or data. The computing device may also include a user interface 1616 to facilitate interaction between the system and a user. The user interface may include a keyboard, mouse, light pen, game control pad, touch interface, or other device.

The computing device 1600 may include a network interface 1614 to facilitate communication via an electronic communications network 1620. The network interface 1614 may be configured to implement wired or wireless communication over local area networks and wide area networks such as the Internet. The device 1600 may send and receive data and/or requests for files via one or more message packets over the network 1620. Message packets sent over the network 1620 may temporarily be stored in a buffer 1609 in memory 1604.

Aspects of the present disclosure leverage artificial intelligence to derive gameplay context information from readily available unstructured data. The unstructured data can be analyzed and mapped to labeled context information that may then be used to empower game enhancement features and in some implementations update a model of the game state.

While the above is a complete description of the preferred embodiment of the present invention, it is possible to use various alternatives, modifications and equivalents. Therefore, the scope of the present invention should be determined not with reference to the above description but should, instead, be determined with reference to the appended claims, along with their full scope of equivalents. Any feature described herein, whether preferred or not, may be combined with any other feature described herein, whether preferred or not. In the claims that follow, the indefinite article "A", or "An" refers to a quantity of one or more of the item following the article, except where expressly stated otherwise. The appended claims are not to be interpreted as including means-plus-function limitations, unless such a limitation is explicitly recited in a given claim using the phrase "means for."

What is claimed is:

1. A method for training a multi-modal system to generate a gameplay context information from unstructured data, comprising:
   training a game screen classification neural network module to classify contextually relevant data from masked gameplay data using labeled gameplay data;
   training one or more game object recognition modules with the masked gameplay data and labeled gameplay data to detect game icons from the masked gameplay data;
   labeling contextually relevant images and game icon data with context information; and
   training a multimodal context generation neural network module with unlabeled contextually relevant images and unlabeled game icon data using the contextually relevant images and the game icon data labeled with context information to generate structured gameplay context information from the unlabeled contextually relevant images and the unlabeled game icon data.

2. The method of claim 1 further comprising:
   training one or more audio classification neural network modules to classify gameplay events within gameplay audio; and
   receiving at the multimodal context generation neural network module gameplay events with masked context information during training.

3. The method of claim 1 wherein the labeled gameplay data includes labeled contextually relevant data corresponding to one or more map screens and labeled game icons that include a player location indicator and map location indicator, and wherein the structured gameplay context information includes at least one of absolute location of a player or relative map location of the player.

4. The method of claim 1 wherein the labeled gameplay data includes contextually relevant data corresponding to one or more inventory screens within the gameplay data and labeled game icons that include item indicators and wherein the structured gameplay context information includes at least inventory contents information.

5. The method of claim 1 further comprising:
   extracting machine-readable text from gameplay data; and
   labeling the machine-readable text with context information, wherein training the multimodal context generation neural network module includes training with unlabeled machine-readable text using the machine-readable text labeled with contextual information.

6. The method of claim 1 wherein the labeled gameplay data includes contextually relevant images corresponding to one or more character status screens within the gameplay data and labeled game icons that include status indicators and wherein the structured gameplay context information includes at least character status information.

7. The method of claim 1 wherein the labeled gameplay data includes contextually relevant data corresponding to one or more user interface images and labeled game icons that include a user interface element and wherein the structured gameplay context information includes game character status information.

8. The method of claim 1 further comprising:
training one or more peripheral input classification modules to classify gameplay commands using peripheral inputs labeled with gameplay commands; and
receiving at the multi-modal context generation neural network module the gameplay commands and masked context information during training.

9. The method of claim 1 further comprising:
training one or more motion input classification modules with a fourth machine learning algorithm to classify gameplay commands using one or more motion inputs labeled with gameplay commands; and
receiving at the multi-modal context generation neural network module the gameplay commands and masked context information during training.

10. A system for generating gameplay context information for a game, the system comprising:
memory storing instructions; and
one or more processors coupled to the memory, that upon execution of the instructions, configured to execute one or more operations comprising:
classifying contextually relevant data from gameplay data;
detecting one or more game icons from gameplay data; and
at least partially generating structured gameplay context information from the contextually relevant data and the one or more icons within the gameplay data.

11. The system of claim 10, wherein the one or more operations further comprise:
classifying one or more gameplay events within the gameplay audio into corresponding classified gameplay events; and
generating structured gameplay context information from the classified gameplay events.

12. The system of claim 10, wherein the one or more operations further comprise:
extracting machine-readable text from gameplay data; and
generating structured gameplay context information from the machine-readable text.

13. The system of claim 10, wherein the one or more operations further comprise:
classifying gameplay commands from gameplay data; and
generating structured gameplay context information from the classified gameplay commands.

14. The system of claim 10, wherein the one or more operations further comprise:
classifying gameplay commands from gameplay data into corresponding classified gameplay commands; and
generating structured gameplay context information from the classified gameplay commands.

15. The system of claim 10 wherein the structured gameplay context information includes at least one of absolute location of a player or relative map location of the player.

16. The system of claim 10 wherein the structured gameplay context information includes game character status information.

17. The system of claim 10 wherein the structured gameplay context information includes game inventory information.

18. The system of claim 10, wherein the one or more operations further comprise:
classifying a contextually relevant sound from the gameplay data into corresponding classified contextually relevant sound;
sending an event flag to enable classifying contextually relevant data from gameplay data and detecting one or more game icons from gameplay data; and
generating structured gameplay context information from the classified contextually relevant sound.

19. The system of claim 18 wherein the contextually relevant sound is a sound based on a menu in the game.

20. The system of claim 10 wherein the one or more operations further comprise:
classifying a contextually relevant command from the gameplay data into corresponding classified contextually relevant command;
sending an event flag to enable classifying contextually relevant data from gameplay data and detecting one or more game icons from gameplay data; and
generating structured gameplay context information from the classified contextually relevant command.

* * * * *